United States Patent
Hershberger et al.

(10) Patent No.: US 12,453,711 B2
(45) Date of Patent: Oct. 28, 2025

(54) PLATINUM COMPLEX ANTI-NEOPLASTIC AGENTS COMPRISING A CANNABINOID LIGAND

(71) Applicant: Diverse Biotech, Inc., Miami, FL (US)

(72) Inventors: Paul Hershberger, Miami, FL (US); Philip Arlen, Miami, FL (US)

(73) Assignee: Diverse Biotech, Inc., Orlando, FL (US)

( * ) Notice: Subject to any disclaimer, the term of this patent is extended or adjusted under 35 U.S.C. 154(b) by 921 days.

(21) Appl. No.: 17/636,081

(22) PCT Filed: Jun. 24, 2020

(86) PCT No.: PCT/US2020/039251
§ 371 (c)(1),
(2) Date: Feb. 17, 2022

(87) PCT Pub. No.: WO2021/034405
PCT Pub. Date: Feb. 25, 2021

(65) Prior Publication Data
US 2022/0288007 A1    Sep. 15, 2022

Related U.S. Application Data

(60) Provisional application No. 62/960,069, filed on Jan. 12, 2020, provisional application No. 62/888,716, filed on Aug. 19, 2019.

(51) Int. Cl.
*A61K 31/282*    (2006.01)
*A61K 31/05*    (2006.01)
*A61K 31/555*    (2006.01)

(52) U.S. Cl.
CPC ............ *A61K 31/282* (2013.01); *A61K 31/05* (2013.01); *A61K 31/555* (2013.01)

(58) Field of Classification Search
CPC ..... A61K 31/282; A61K 31/05; A61K 31/555
See application file for complete search history.

(56) References Cited

U.S. PATENT DOCUMENTS

| | | | |
|---|---|---|---|
| 9,895,343 B2 | 2/2018 | Sawyer et al. | |
| 2011/0086113 A1 | 4/2011 | Velasco Diez et al. | |
| 2013/0303606 A1 | 11/2013 | Lippard et al. | |
| 2014/0309183 A1 | 10/2014 | Kerr | |
| 2014/0343139 A1 | 11/2014 | Lippard et al. | |
| 2018/0346499 A1* | 12/2018 | Giacomini | C07F 15/0093 |
| 2019/0099492 A1 | 4/2019 | Velasco Diez et al. | |

FOREIGN PATENT DOCUMENTS

| | | | | |
|---|---|---|---|---|
| EP | 3171872 B1 | 11/2020 | | |
| EP | 3946315 A1 | 2/2022 | | |
| WO | WO-2009032172 A2 * | 3/2009 | | A61K 31/29 |
| WO | 2018/024172 A1 | 2/2018 | | |
| WO | 2019227167 A1 | 12/2019 | | |
| WO | 2021077111 A1 | 4/2021 | | |
| WO | 2021248054 A1 | 12/2021 | | |

OTHER PUBLICATIONS

Craig, Olivia, Carolina Salazar, and Kylie L. Gorringe. "Options for the treatment of mucinous ovarian carcinoma." Current treatment options in oncology 22.12 (2021): 114. (Year: 2021).*
Parveen, Shazia. "Platinum-based cancer chemotherapeutics: Recent trends and future perspectives." Current Chinese Science 2.4 (2022): 275-293. (Year: 2022).*
Zhang, Chunyu, et al. "Platinum-based drugs for cancer therapy and anti-tumor strategies." Theranostics 12.5 (2022): 2115. (Year: 2022).*
Extended European Search Report for Application No. 20853698.7 dated Nov. 21, 2023, 9 pages.
Hua et al., "Multifunctional platinum (IV) complexes as immunostimulatory agents to promote cancer immunochemotherapy by inhibiting tryptophan-2,3-dioxygenase," Eur. J. Med. Chem. 169, 29-41, 2019.
Jeong et al., "Cannabidiol Overcomes Oxaliplatin Resistance by Enhancing NOS3- and SOD2-Induced Autophagy in Human Colorectal Cancer Cells," Cancers 11, 18 pp. 2019.
King et al., "Single and combined effects of [Delta]9-tetrahydrocannabinol and cannabidiol in a mouse model of themotherapy-induced neuropathic pain," Br. J. Pharmacol. 174, 2832-41, 2017.
Sen et al., "Platinum Complexes with Bioactive Nitroxyl Radicals: Synthesis and Antitumor Properties," Chapter 14 in Nitroxides—Theory, Experiment and Applications, Sep. 12, 2012, 22 pages.
International Search Report and Written Opinion for PCT/US2020/039251 dated Oct. 2, 2020, 9 pages.

* cited by examiner

*Primary Examiner* — James H Alstrum-Acevedo
*Assistant Examiner* — Justin Christopher Sanchez
(74) *Attorney, Agent, or Firm* — Banner & Witcoff, Ltd.

(57) ABSTRACT

This disclosure provides platinum complex anti-neoplastic agents that comprise at least one cannabinoid ligand as either a leaving ligand or an axial ligand. After the agent enters the cell, the cannabinoid ligand is released as a cannabinoid, where the cannabinoid can then provide additional therapeutic benefits.

23 Claims, No Drawings

PLATINUM COMPLEX ANTI-NEOPLASTIC AGENTS COMPRISING A CANNABINOID LIGAND

Each reference cited in this disclosure is incorporated herein in its entirety.

TECHNICAL FIELD

This disclosure relates generally to the treatment of neoplasms.

DETAILED DESCRIPTION

Platinum complexes comprise a central platinum atom complexed to leaving and non-leaving ligands. Platinum complexes with four ligands have an oxidation state of +2 ("Pt(II) complexes"), and those with six ligands have an oxidation state of +4 ("Pt(IV) complexes").

The general structures of Pt(II) and Pt(IV) complexes are shown below.

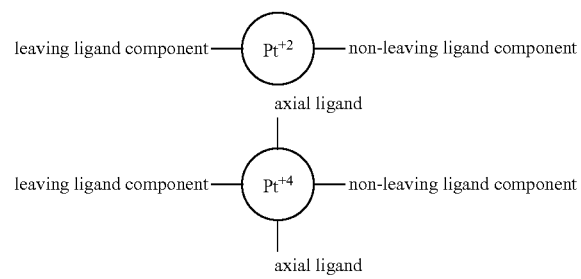

The "non-leaving ligand component" can be a single (bidentate or tridentate) non-leaving ligand or can be two or three individual non-leaving ligands. The "leaving ligand component" can be one or two individual ligands or can be a bidentate leaving ligand.

Both Pt(II) and Pt(IV) complex anti-neoplastic agents are well known in the art. Agents in commercial use include cisplatin, carboplatin, oxaliplatin, eptaplatin, lobaplatin, nedaplatin, and satraplatin. As illustrated below, these agents work by alkylating DNA at the expense of the bond between one or two leaving ligands (circled) and the central platinum atom.

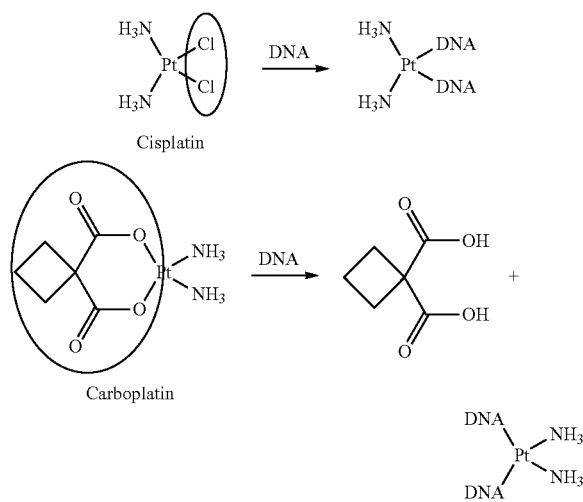

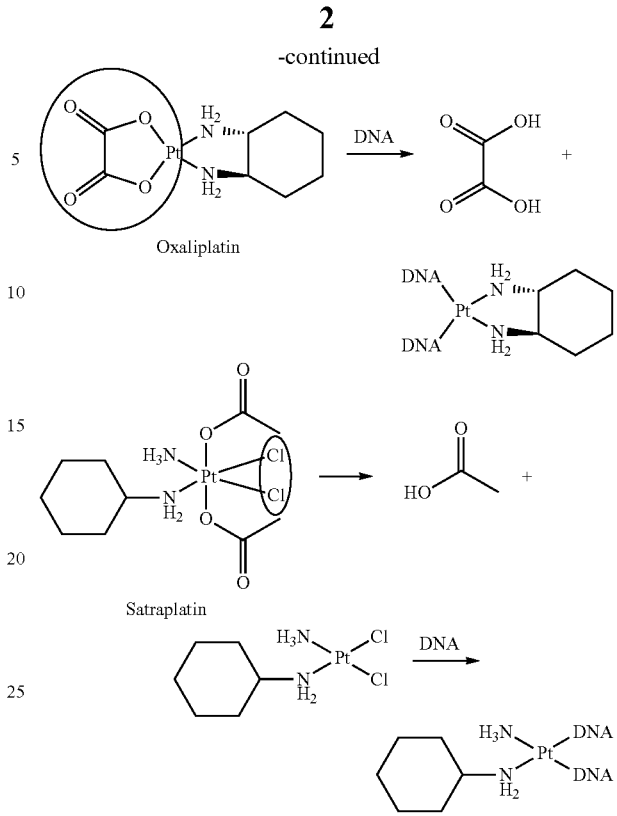

Overview

The platinum complex anti-neoplastic agents ("PCAN agents") described in this disclosure comprise at least one cannabinoid ligand as either a leaving ligand or an axial ligand. After the agent enters the cell, the cannabinoid ligand is released as a cannabinoid, where the cannabinoid can then provide additional therapeutic benefits. These benefits include, but are not limited to, anti-tumor activity (Massi et al., J. Pharmacol. Exp. Ther. 308, 838-45, e-pub 2003; Guindon & Hohmann, Br. J. Pharmacol. 163, 1447-63, 2011; Borrelli et al., Carcinogenesis 35, 2787-97, 2014; McAllister et al., J. Neuroimmune Pharmacol. 10, 255-67, 2015) and inhibition of tumor progression (Velasco et al., Nat. Rev. Cancer 12, 436-44, 2012).

As described in more detail below, a cannabinoid can be attached to a central platinum atom as a leaving ligand or, for Pt(IV) complexes, as an axial ligand. In various embodiments, a Pt(II) PCAN agent can incorporate a cannabinoid in place of one leaving ligand or in place of each of two leaving ligands. In various embodiments, a Pt(IV) PCAN agent can incorporate a cannabinoid in place of one axial ligand or in place of each of two axial ligands. In addition, a Pt(IV) PCAN agent can incorporate a cannabinoid in place of one leaving ligand or in place of each of two leaving ligands. Thus, a Pt(II) PCAN agent can incorporate and release one or two cannabinoids; and a Pt(IV) PCAN agent can incorporate and release one, two, three, or four cannabinoids. In any particular PCAN agent that incorporates two or more cannabinoids, the cannabinoids can be the same or different.

In the description that follows, wherever a leaving ligand, a non-leaving ligand component, or an axial ligand is unspecified in an embodiment of a PCAN agent, such ligands can be the ligands of any platinum complex anti-neoplastic agent. See, e.g., Kozubik et al., 2008; Johnstone et al., 2016; Intini et al., 2017; Neumann et al., 2014; Tolan et al., 2018; Jia et al., 2019; Zhou et al., 2018; Li et al., 2018; Ndagi et al., 2017; Monroe et al., 2018; U.S. Pat. Nos. 7,268,244; 7,759,488; 9,227,991; 9,593,139; 9,771,387; 10,053,478.

For simplicity, PCAN agents are depicted in this disclosure without indicating any stereochemistry. It is well known, however, that both cannabinoids and platinum complexes exhibit a variety of stereochemistries. In this disclosure, unless otherwise indicated, any particular PCAN agent structure includes all possible isomers, including isomers of the cannabinoid ligands incorporated into the PCAN agent.

In addition, the use of any particular leaving ligand, non-leaving ligand, or cannabinoid ligand in the structural examples below is for simplicity and is not intended to limit any of the ligands of the disclosed PCAN agents.

Cannabinoid Ligand

A "cannabinoid ligand" as used in this disclosure is that portion of a cannabinoid that is present in a PCAN agent in place of a leaving ligand or an axial ligand. Illustrations are shown in the examples below.

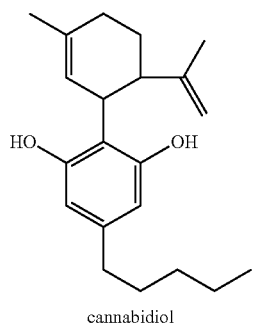
cannabidiol

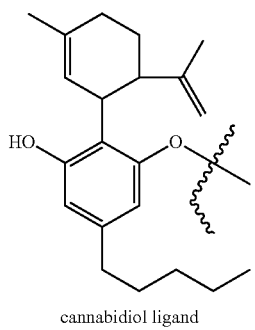
cannabidiol ligand

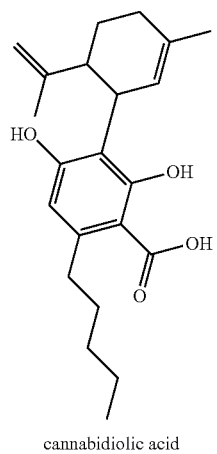
cannabidiolic acid

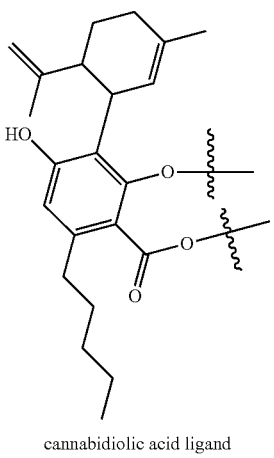
cannabidiolic acid ligand

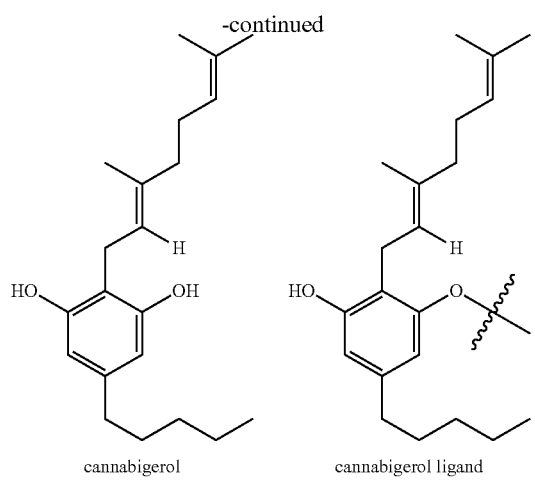
cannabigerol  cannabigerol ligand

A cannabinoid ligand, either a cannabinoid leaving ligand or a cannabinoid axial ligand, can be provided by any cannabinoid that contains a hydroxy group (aromatic or aliphatic) or a carboxyl group by which the cannabinoid can be attached to the central platinum atom, either directly or via a linker.

The cannabinoid can be a naturally occurring molecule, either isolated or synthesized, or a modified version of a naturally occurring molecule. See, for example, Morales et al., Frontiers in Pharmacology June 2017 review, 1-18.

Examples of cannabinoids include, but are not limited to, cannabigerols, cannabichromenes, cannabidiols, tetrahydrocannabinols, cannabicyclols, cannabielsoins, cannabinols, cannabinodiols, cannabitriols, dehydrocannabifurans, cannabifurans, cannabichromanons, and cannabiripsols.

Examples of cannabigerols include cannabigerolic acid (CBGA), cannabigerolic acid monomethylether (CBGAM), cannabigerol (CBG), cannabigerol monomethyleither (CBGM), cannabigerovarinic acid (CBGVA), and cannabigerovarin (CBGV).

Examples of cannabichromenes include cannabichromenic acid (CBC), cannabichromene (CBC), cannabichromevarinic acid (CBCVA), and cannabichromevarin (CBCV).

Examples of cannabidiols include cannabidiolic acid (CBDA), cannabidiol (CBD), cannabidiol monomethylether (CBDM), cannabidiol-$C_4$ (CBD-$C_4$), cannabidivarinic acid (CBDVA), cannabidivarin (CBDV), and cannabidiorcol (CBD-$C_1$).

Examples of tetrahydrocannabinols include Δ-9-tetrahydrocannabinolic acid A (THCA-A), Δ-9-tetrahydrocannabinolic acid B (THCA-B), Δ-9-tetrahydrocannabinol (THC), Δ-9-tetrahydrocannabinolic acid-$C_4$ (THCA-$C_4$), Δ-9-tetrahydrocannabinol-$C_4$ (THC-$C_4$), Δ-9-tetrahydrocannabivarinic acid (THCVA), Δ-9-tetrahydrocannabivarin (THCV), Δ-9-tetrahydrocannabiorcolic acid (THCA-$C_1$), Δ-9-tetrahydrocannabiorcol (THC-$C_1$), Δ-7-cis-tetrahydrocannabivarin, Δ-8-tetrahydrocannabinolic acid ($Δ^8$-THCA), and Δ-8-tetrahydrocannabinol ($Δ^8$-THC).

Examples of cannabicyclols include cannabicyclolic acid (CBLA), cannabicyclol (CBL), and cannabicyclovarin (CBLV).

Examples of cannabielsoins include cannabielsoic acid A (CBEA-A), cannabielsoic acid B (CBEA-B), and cannabielsoin (CBE).

Examples of cannabinols and cannabinodiols include cannabinolic acid (CBNA), cannabinol (CBN), cannabinol-$C_4$ (CBN-C$_4$), cannabivarin (CBV), cannabinol-C$_2$ (CBN-C$_2$), cannabiorcol (CBN-C$_1$), cannabinodiol (CBND), and cannabinodivarin (CBVD).

Examples of cannabitriols include cannabitriol (CBT), 10-ethoxy-9-hydroxy-Δ-6a-tetrahydrocannabinol, cannabitriolvarin (CBTV), and ethoxy-cannabitriolvarin (CBTVE).

Cannabifurans include dehydrocannabifuran (DCBF) and cannabifuran (CBF).

Examples of other cannabinoids include cannabichromanon (CBCN), 10-oxo-Δ-6a-tetrahydrocannabinol (OTHC), cannabiripsol (CBR), and trihydroxy-Δ-9-tetrahydrocannabinol (triOH-THC).

In some embodiments, the cannabinoid ligand is provided by cannabidiol.

Platinum Complex Anti-Neoplastic Agents Comprising a Cannabinoid Leaving Ligand

In some embodiments, a PCAN agent comprises (a) a central platinum atom; (b) a non-leaving ligand component; and (c) a leaving ligand component, which comprises a first cannabinoid leaving ligand attached to the central platinum atom via an oxygen atom of (i) a first hydroxy group of the first cannabinoid ligand or of (ii) a first carboxyl group of the first cannabinoid ligand. Non-limiting examples are shown below.

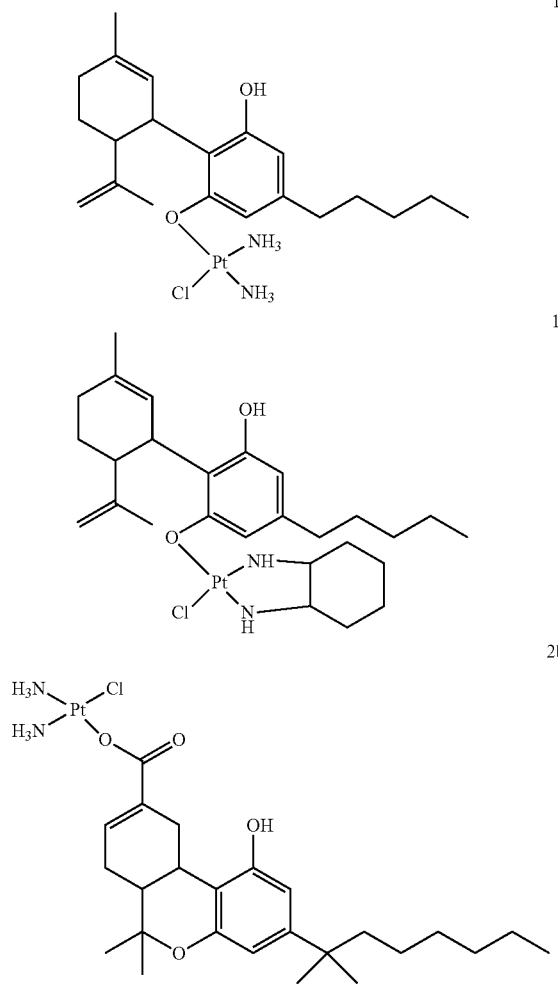

In some embodiments, the leaving ligand component comprises a second cannabinoid ligand ("second cannabinoid leaving ligand"). The first and second cannabinoid leaving ligands can be the same or different. Non-limiting examples are shown below.

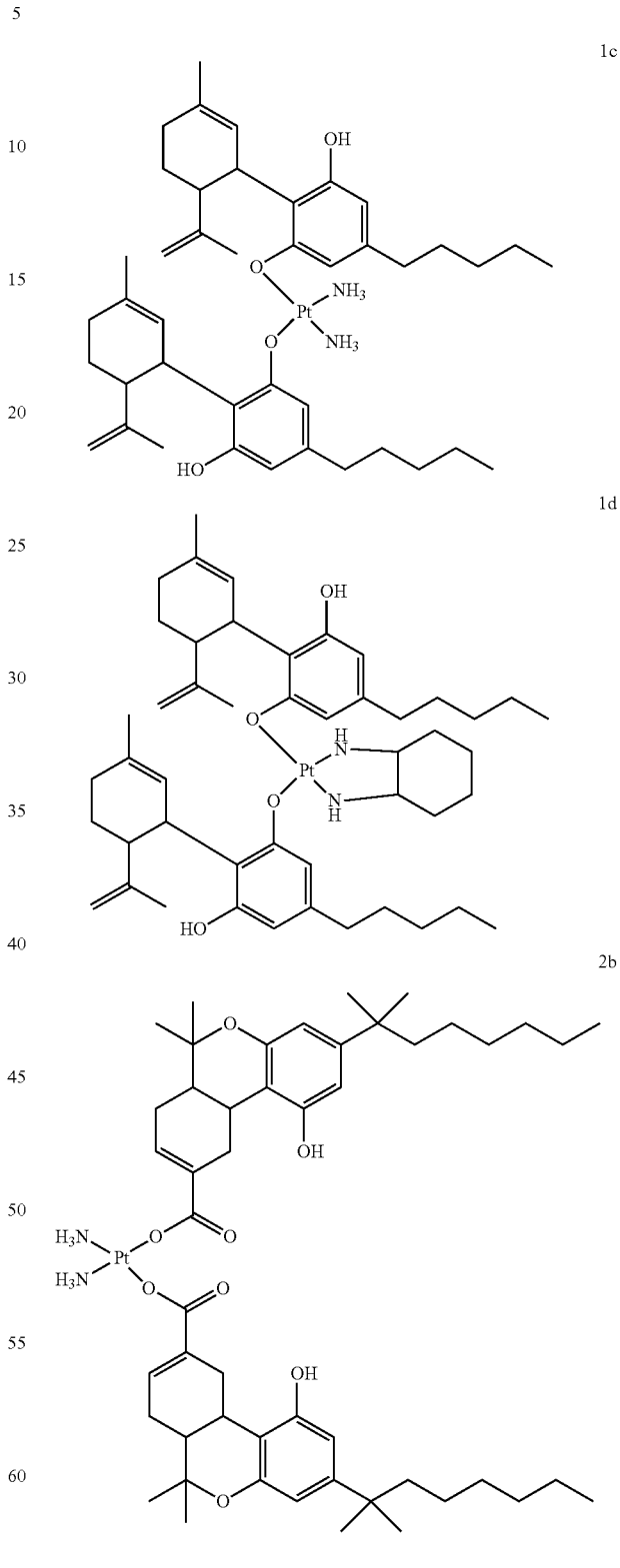

In some embodiments, the cannabinoid ligand component is a bidentate cannabinoid ligand ("bidentate cannabinoid leaving ligand"). A non-limiting example is shown below.

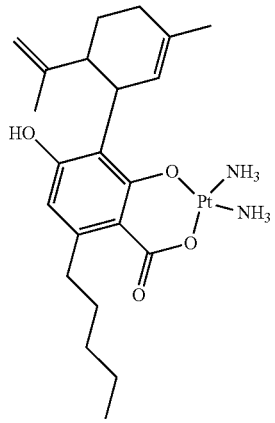

In some embodiments, the PCAN agent further comprises (d) a first axial ligand and a second axial ligand. Non-limiting examples of these embodiments are shown below, in which represents an axial ligand.

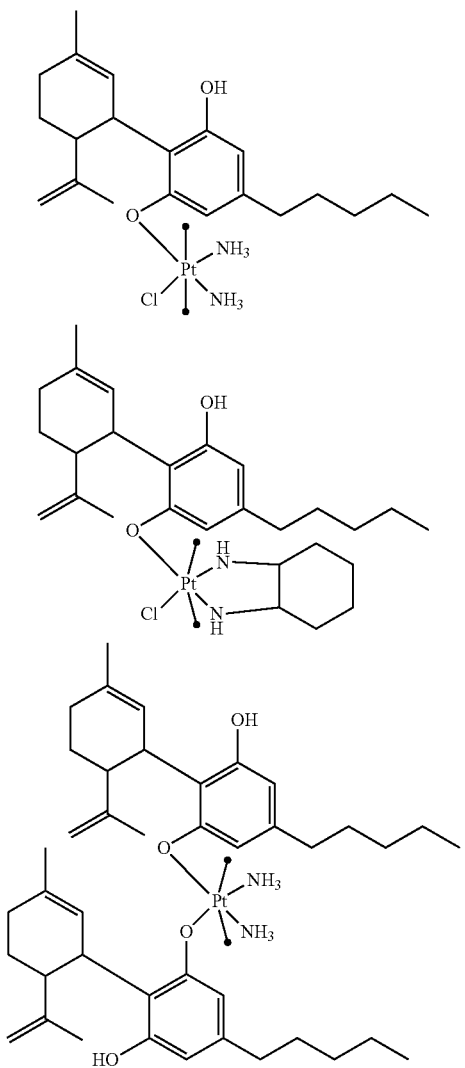

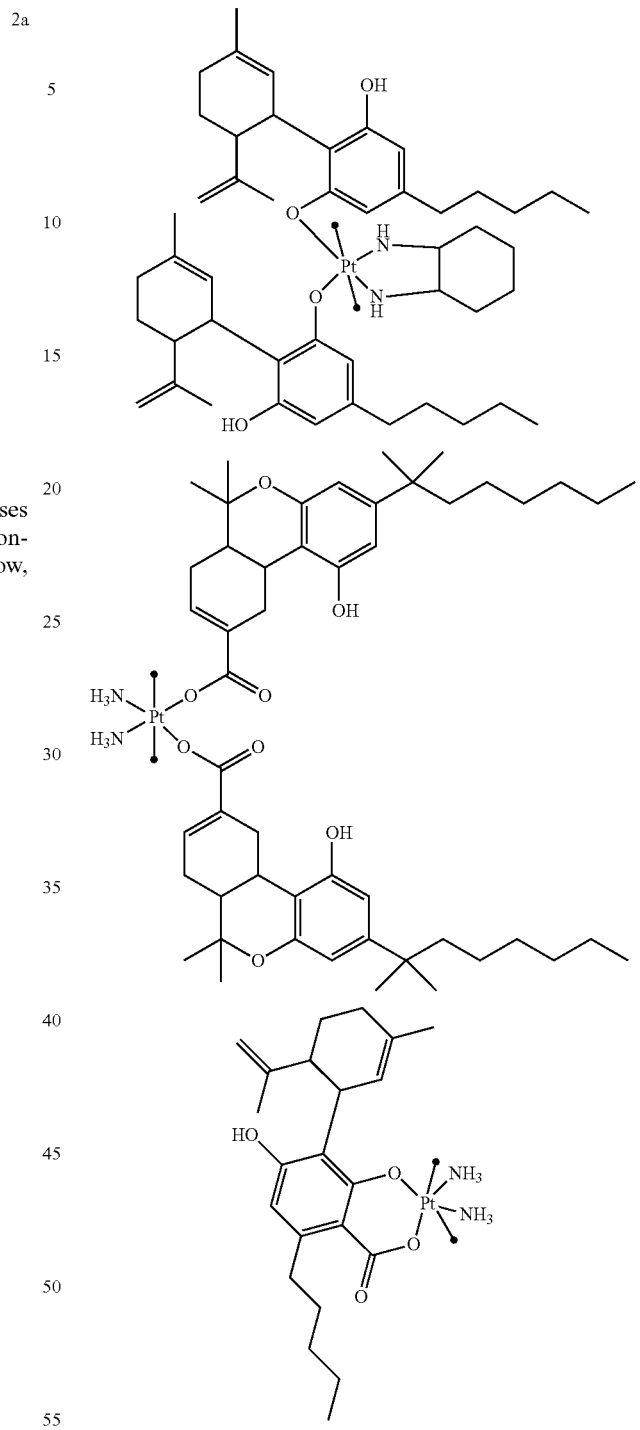

In some embodiments, a cannabinoid leaving ligand is attached to the central platinum atom by a linker. In the linkers described below, * is the point of attachment of a cannabinoid leaving ligand and ** is the point of attachment to the central platinum atom. In some embodiments, a first cannabinoid leaving ligand is connected to the central platinum atom by a linker. In some embodiments, a first and a second cannabinoid leaving ligand are connected to the central platinum atom by a linker. The linkers, which can be the same or different, are described below.

In some embodiments, the linker is

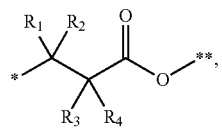

in which:
(a) R₁, R₂, R₃, and R₄ independently are selected from the group consisting of:
(a) H;
(b) C1-C8 linear or branched alkyl, optionally substituted with
  (1) 1, 2, 3, 4, 5, 6, 7, 8, or 9 fluorine atoms; and/or
  (2) 1, 2, or 3 substituents independently selected from the Group One Substituents;
(c) C1-C8 linear or branched heteroalkyl containing 1, 2, or 3 heteroatoms independently selected from O, N, and S and optionally substituted with
  (1) 1, 2, 3, 4, 5, 6, 7, 8, or 9 fluorine atoms; and/or
  (2) 1, 2, or 3 substituents independently selected from the Group One Substituents;
(d) phenyl, optionally substituted with 1, 2, or 3 substituents independently selected from the group consisting of:
  (1) C1-C6 linear or branched alkyl, optionally substituted with
    (i) 1, 2, 3, 4, 5, or 6 fluorine atoms; and/or
    (ii) 1 or 2 substituents independently selected from the Group Two Substituents; and
  (2) C1-C6 linear or branched heteroalkyl containing 1 or 2 heteroatoms independently selected from O, N, and S and optionally substituted with
    (i) 1, 2, 3, 4, 5, or 6 fluorine atoms; and/or
    (ii) 1 or 2 substituents independently selected from the Group One Substituents;
(e) a 6- to 10-membered aromatic, optionally substituted with 1, 2, 3, or 4 substituents independently selected from the group consisting of:
  (1) phenyl;
  (2) halide;
  (3) cyano;
  (4) C1-C6 linear or branched alkyl, optionally substituted with
    (i) 1, 2, 3, 4, 5, 6, 7, 8, or 9 fluorine atoms; and/or
    (ii) 1, 2, or 3 substituents independently selected from the Group Two Substituents, and
  (5) C1-C6 linear or branched heteroalkyl containing 1, 2, or 3 atoms independently selected from O, N, and S and optionally substituted with
    (i) 1, 2, 3, 4, 5, 6, 7, 8, or 9 fluorine atoms; and/or
    (ii) 1, 2, or 3 substituents independently selected from the Group Two Substituents;
(f) 5- to 10-membered heteroaromatic comprising 1, 2, 3, 4, 5, or 6 heteroatoms independently selected from O, N, and S and optionally substituted with 1, 2, 3, or 4 substituents independently selected from
  (1) phenyl;
  (2) halide;
  (3) cyano;
  (4) trifluoromethyl;
  (5) C1-C6 linear or branched alkyl optionally substituted with
    (i) 1, 2, 3, 4, 5, 6, 7, 8, or 9 fluorine atoms; and/or
    (ii) 1, 2, or 3 substituents independently selected from the Group Two Substituents; and
  (6) C1-C6 linear or branched heteroalkyl containing 1, 2, or 3 atoms independently selected from O, N, and S and optionally substituted with
    (i) 1, 2, 3, 4, 5, 6, 7, 8, or 9 fluorine atoms; and/or
    (ii) 1, 2, or 3 substituents independently selected from the Group Two Substituents;

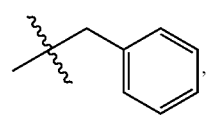

(g)

optionally substituted with 1, 2, or 3 substituents independently selected from the group consisting of:
  (1) C1-C6 linear or branched alkyl, optionally substituted with
    (i) 1, 2, 3, 4, 5, or 6 fluorine atoms; and/or
    (ii) 1, 2, or 3 substituents independently selected from the Group Two Substituents;
(h) 3- to 9-membered cycloheteroalkyl having 1, 2, or 3 heteroatoms independently selected from O, N, and S and optionally substituted with 1, 2, or 3 substituents independently selected from the group consisting of:
  (1) C1-C6 linear or branched alkyl, optionally substituted with
    (i) 1, 2, 3, 4, 5, 6, 7, 8, or 9 fluorine atoms; and/or
    (ii) 1, 2, or 3 substituents independently selected from the Group Two Substituents,
  (2) C1-C6 linear or branched heteroalkyl, optionally substituted with
    (i) 1, 2, 3, 4, 5, 6, 7, 8, or 9 fluorine atoms and/or
    (ii) 1, 2, or 3 substituents independently selected from the Group Two Substituents,
  (3) phenyl, optionally substituted with 1, 2, or 3 substituents independently selected from the Group Two Substituents, and
  (4) 5- to 10-membered heteroaromatic, optionally substituted with 1, 2, or 3 substituents independently selected from the Group Two Substituents; and
(i) C3-C6 cycloalkyl, optionally substituted with 1, 2, or 3 substituents independently selected from:
  (1) C1-C6 linear or branched alkyl, optionally substituted with
    (i) 1, 2, 3, 4, 5, 6, 7, 8, or 9 fluorine atoms; and/or
    (ii) 1, 2, or 3 substituents independently selected from the Group Two Substituents,
  (2) C1-C6 linear or branched heteroalkyl, optionally substituted with
    (i) 1, 2, 3, 4, 5, 6, 7, 8, or 9 fluorine atoms; and/or
    (ii) 1, 2, or 3 substituents independently selected from the Group Two Substituents,
  (3) phenyl, optionally substituted with 1, 2, or 3 substituents independently selected from Group Two Substituents; and
  (4) 5- to 10-membered heteroaromatic, optionally substituted with 1, 2, or 3 substituents independently selected from the Group Two Substituents
OR
(b) when any two of R₁, R₂, R₃, and R₄, independently are (i) C1-C6 linear or branched alkyl or (ii) C1-C6 linear or branched heteroalkyl having 1, 2, or 3 heteroatoms independently selected from O, S, and N, then the two of R₁, R₂, R₃, and R₄, together with the carbons to which they are attached, form a 3-6-membered ring.

"Group One Substituents" is a group of substituents consisting of:
(a) —OH;
(b) —NH2;
(c) =O;
(d) =S;
(e) =NR7, where R7 is H or is C1-C3 linear or branched alkyl or C1-C3 linear or branched heteroalkyl comprising an O, N, or S atom;
(f) —C(O)OR4, wherein R4 is H or C1-C3 linear or branched alkyl;
(g) —C(O)NR5R6, wherein R5 and R6 independently are H or C1-C6 linear or branched alkyl;
(h) halide;
(i) C1-C6 linear or branched alkoxyl;
(j) C1-C6 linear or branched alkylamino;
(k) C1-C6 linear or branched dialkylamino;
(l) 6- to 10-membered aromatic, optionally substituted with 1, 2, 3, or 4 substituents independently selected from
  (i) phenyl;
  (ii) halide;
  (iii) cyano;
  (iv) C1-C6 linear or branched alkyl, optionally substituted with
    (1) 1, 2, 3, 4, 5, 6, 7, 8, or 9 fluorine atoms; and/or
    (2) 1, 2, or 3 substituents independently selected from the Group Two Substituents; and
  (v) C1-C6 linear or branched heteroalkyl containing 1, 2, or 3 atoms independently selected from O, N, and S and optionally substituted with
    (1) 1, 2, 3, 4, 5, 6, 7, 8, or 9 fluorine atoms; and/or
    (2) 1, 2, or 3 substituents independently selected from the Group Two Substituents;
(m) 5- to 10-membered heteroaromatic, optionally substituted with 1, 2, 3, or 4 substituents independently selected from
  (i) phenyl;
  (ii) halide;
  (iii) cyano;
  (iv) C1-C6 linear or branched alkyl, optionally substituted with
    (1) 1, 2, 3, 4, 5, 6, 7, 8, or 9 fluorine atoms; and/or
    (2) 1, 2, or 3 substituents independently selected from the Group Two Substituents; and
  (v) C1-C6 linear or branched heteroalkyl containing 1, 2, or 3 atoms independently selected from O, N, and S and optionally substituted with
    (1) 1, 2, 3, 4, 5, 6, 7, 8, or 9 fluorine atoms; and/or
    (2) 1, 2, or 3 substituents independently selected from the Group Two Substituents;
(n) 3- to 9-membered cycloheteroalkyl having 1, 2, or 3 heteroatoms independently selected from O, N, and S, optionally substituted with 1, 2, 3, or 4 substituents independently selected from
  (i) phenyl;
  (ii) halide;
  (iii) cyano;
  (iv) C1-C6 linear or branched alkyl, optionally substituted with
    (1) 1, 2, 3, 4, 5, 6, 7, 8, or 9 fluorine atoms; and/or
    (2) 1, 2, or 3 substituents independently selected from the Group Two Substituents; and
  (v) C1-C6 linear or branched heteroalkyl containing 1, 2, or 3 atoms independently selected from O, N, and S and optionally substituted with
    (1) 1, 2, 3, 4, 5, 6, 7, 8, or 9 fluorine atoms; and/or
    (2) 1, 2, or 3 substituents independently selected from the Group Two Substituents; and
(o) C3-C6 cycloalkyl, optionally substituted with 1, 2, 3, or 4 substituents independently selected from
  (i) phenyl;
  (ii) halide;
  (iii) cyano;
  (iv) C1-C6 linear or branched alkyl, optionally substituted with
    (1) 1, 2, 3, 4, 5, 6, 7, 8, or 9 fluorine atoms; and/or
    (2) 1, 2, or 3 substituents independently selected from the Group Two Substituents; and
  (v) C1-C6 linear or branched heteroalkyl containing 1, 2, or 3 atoms independently selected from O, N, and S and optionally substituted with
    (1) 1, 2, 3, 4, 5, 6, 7, 8, or 9 fluorine atoms; and/or
    (2) 1, 2, or 3 substituents independently selected from the Group Two Substituents.

"Group Two Substituents" is a group of substituents consisting of:
(a) —OH;
(b) —NH2;
(c) =O;
(d) =S;
(e) =NR7, where R7 is H or is C1-C3 linear or branched alkyl or C1-C3 linear or branched heteroalkyl comprising an O, N, or S atom;
(f) —C(O)OR4, wherein R4 is H or C1-C3 linear or branched alkyl;
(g) —C(O)NR5R6, wherein R5 and R6 independently are H or C1-C6 linear or branched alkyl;
(h) halide;
(i) cyano;
(j) trifluoromethyl;
(k) C1-C6 linear or branched alkoxyl;
(l) C1-C6 linear or branched alkylamino;
(m) C1-C6 linear or branched dialkylamino;
(n) 6- to 10-membered aromatic; and
(o) 5- to 10-membered heteroaromatic comprising 1, 2, 3, 4, 5, or 6 heteroatoms independently selected from O, N, and S In some embodiments, the linker is

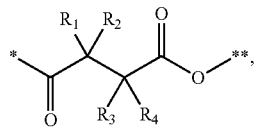

in which R₁, R₂, R₃, and R₄ are as defined above.

Non-limiting examples are shown below.

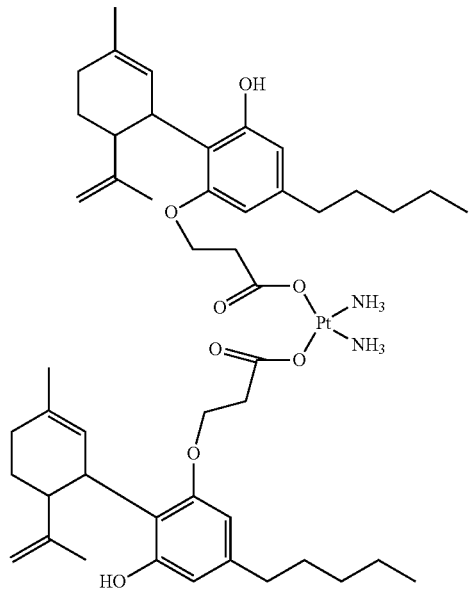

3a

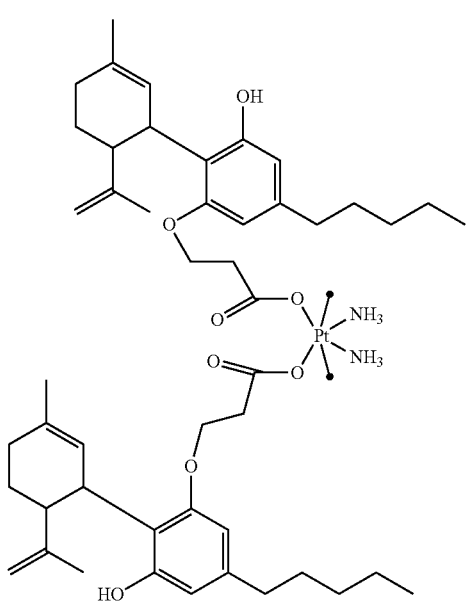

3a'

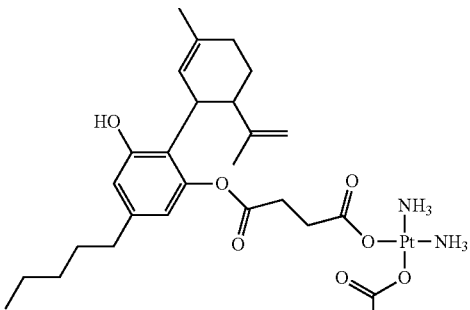

5

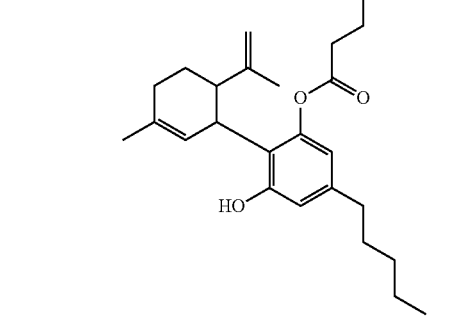

5b

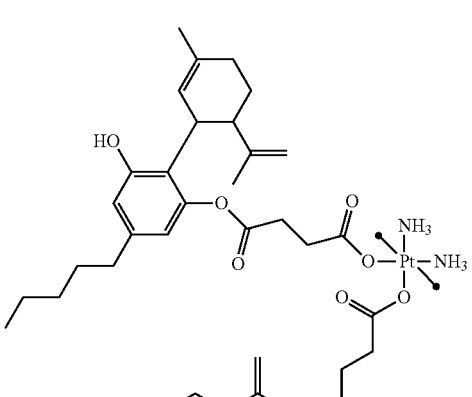

5b'

Platinum Complex Anti-Neoplastic Agents Comprising a Cannabinoid Axial Ligand

In some embodiments, a PCAN agent comprises (a) a central platinum atom; (b) a non-leaving ligand component; (c) a leaving ligand component; and (d) a first axial ligand and a second axial ligand. In these embodiments, at least the first axial ligand is a first cannabinoid ligand ("first cannabinoid axial ligand") attached to the central platinum atom via an oxygen atom of (i) a first hydroxy group of the first cannabinoid ligand or (ii) a first carboxyl group of the first cannabinoid ligand. In some embodiments, the first and second axial ligand are independently chosen cannabinoid ligands attached to the central platinum atom via an oxygen atom of (i) a hydroxy group of the first or second cannabinoid ligand or (ii) a carboxyl group of the first or second cannabinoid ligand. In some embodiments, one or both of the leaving ligands is a cannabinoid leaving ligand, as described above. In some embodiments, the leaving ligand component is a bidentate leaving ligand.

In the non-limiting examples below, for simplicity each cannabinoid axial ligand is a cannabidiol axial ligand. ■ and ▮ each represents a cannabinoid leaving ligand, which can be the same or different.

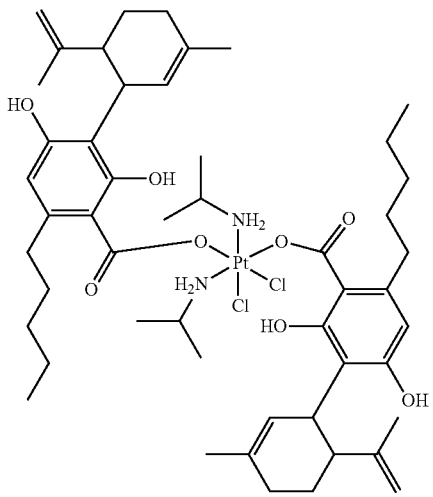

2c'

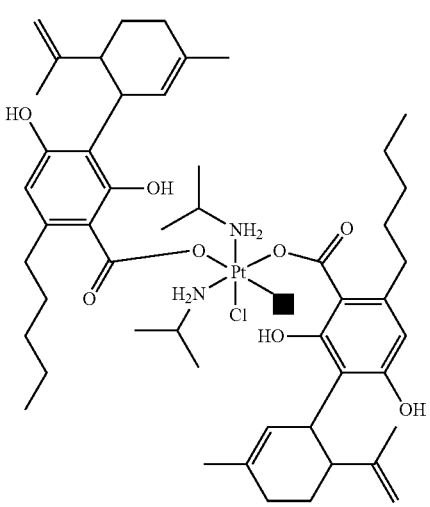

2c

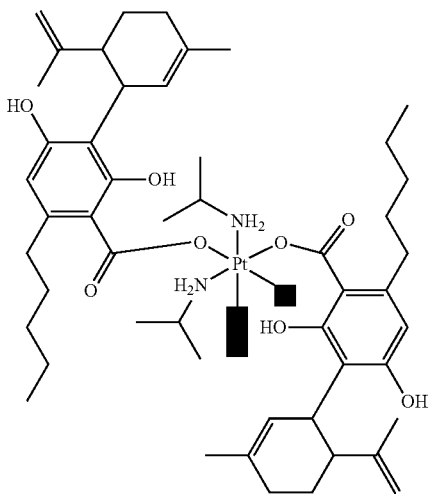

2c''

In some embodiments, an axial cannabinoid ligand is attached to the central platinum atom by a linker. In the linkers described below, * is the point of attachment of a cannabinoid axial ligand and ** is the point of attachment to the central platinum atom. In some embodiments, a first cannabinoid axial ligand is connected to the central platinum atom by a linker. In some embodiments, a first and a second cannabinoid axial ligand are connected to the central platinum atom by a linker. The linkers, which can be the same or different, are described below.

In some embodiments, the linker is

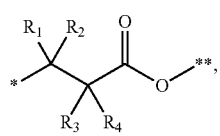

in which $R_1$, $R_2$, $R_3$, and $R_4$ are as defined above.

In some embodiments, the linker is

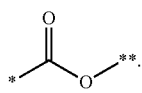

In some embodiments, the linker is

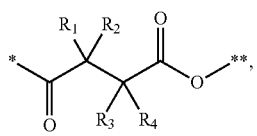

in which $R_1$, $R_2$, $R_3$, and $R_4$ are as defined above.

In some embodiments, the linker is
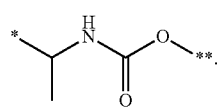
In some embodiments, the linker is
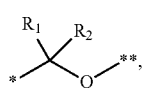
in which $R_1$ and $R_2$ are as defined above.
In the non-limiting examples below, for simplicity each cannabinoid axial ligand is a cannabidiol axial ligand. ■ and ▮ each represents a cannabinoid leaving ligand, which can be the same or different.
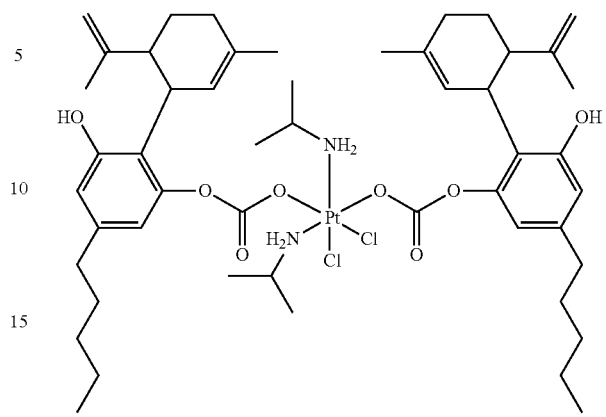
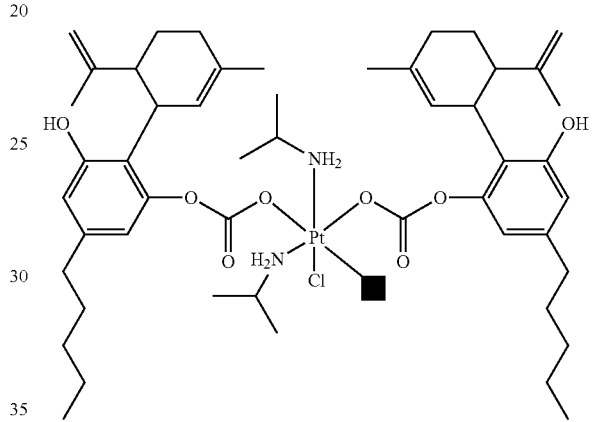
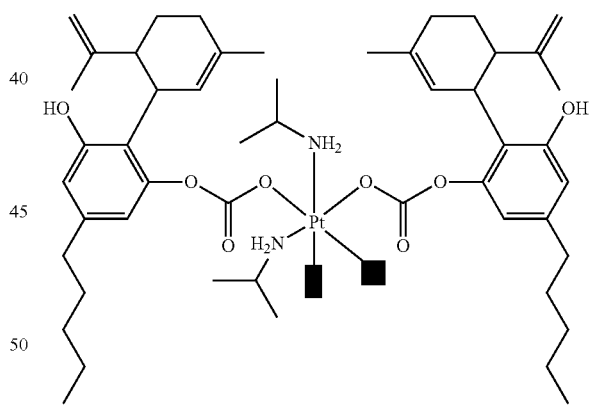
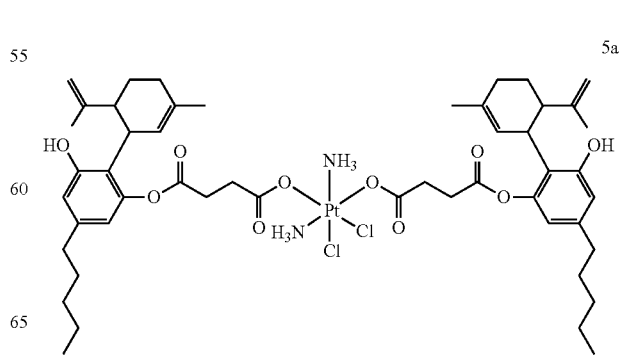

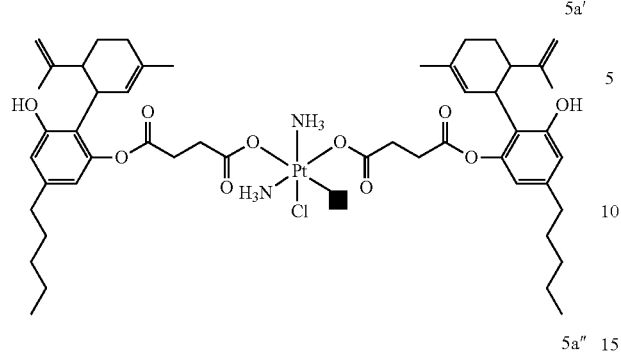
5a'
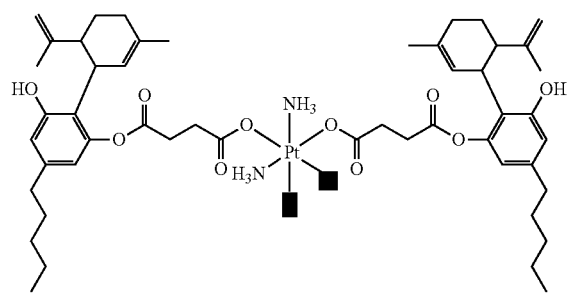
5a''
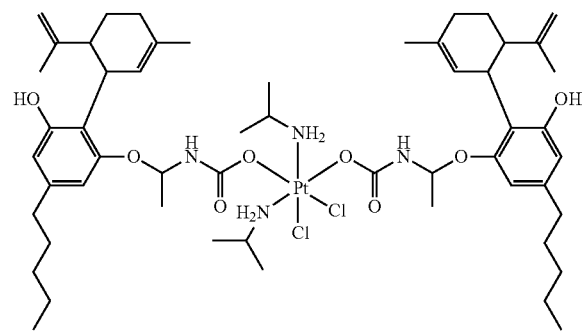
6
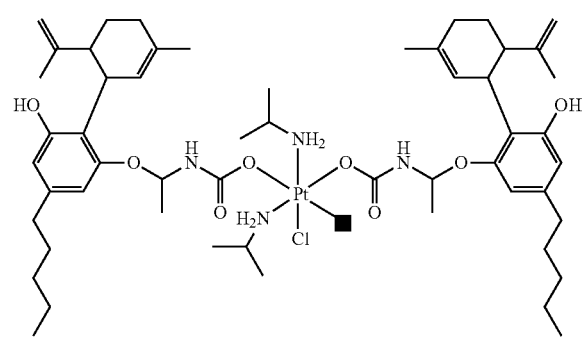
6'
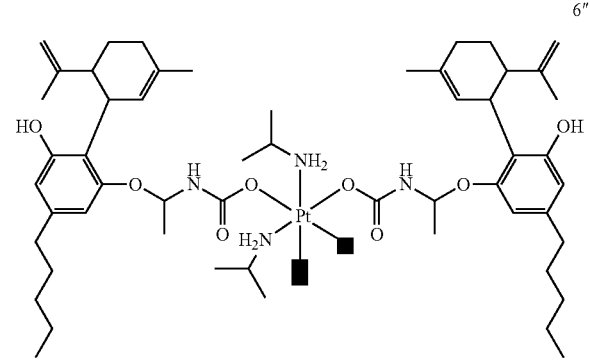
6''
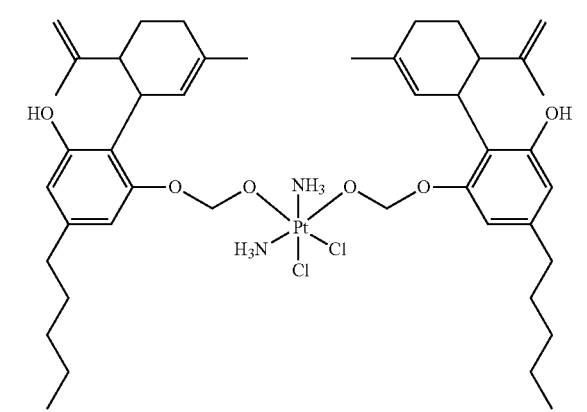
7
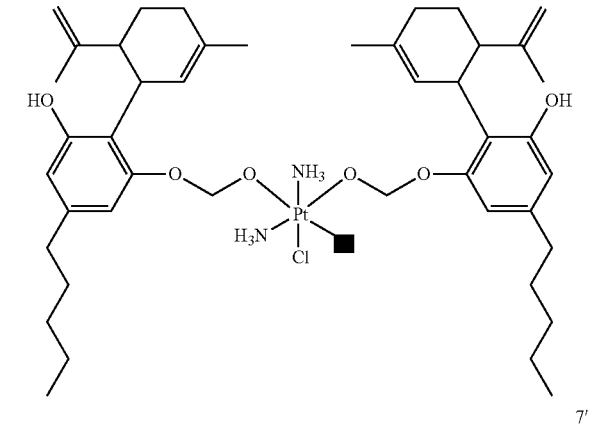
7'
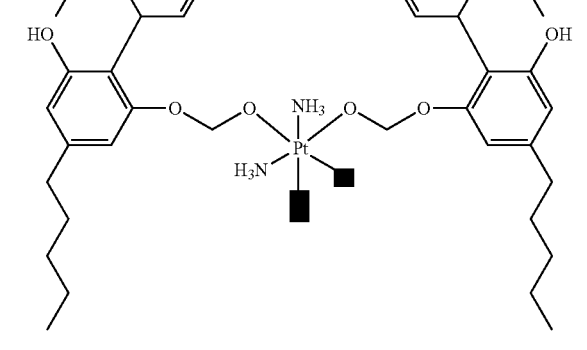
7'

Non-Leaving Ligand Component

In some embodiments, the non-leaving ligand component is (i) a first non-leaving ligand and a second non-leaving ligand, as illustrated, for example, by cisplatin, carboplatin, and nedaplatin:

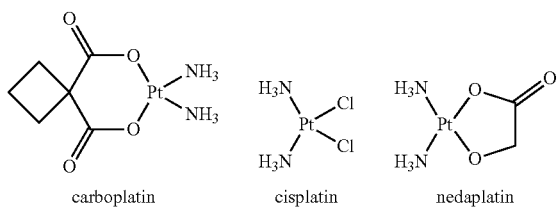

carboplatin  cisplatin  nedaplatin

In some embodiments, the non-leaving ligand component of a PCAN agent is a first non-leaving ligand, a second non-leaving ligand, and a third non-leaving ligand, as illustrated, for example, by pyriplatin and phenanthriplatin:

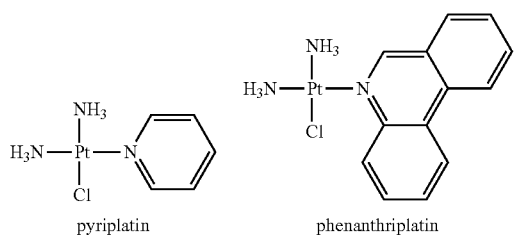

pyriplatin  phenanthriplatin

In some embodiments, the non-leaving ligand component is a bidentate non-leaving ligand, as illustrated, for example, by oxaliplatin, lobaplatin, heptaplatin, and eptaplatin:

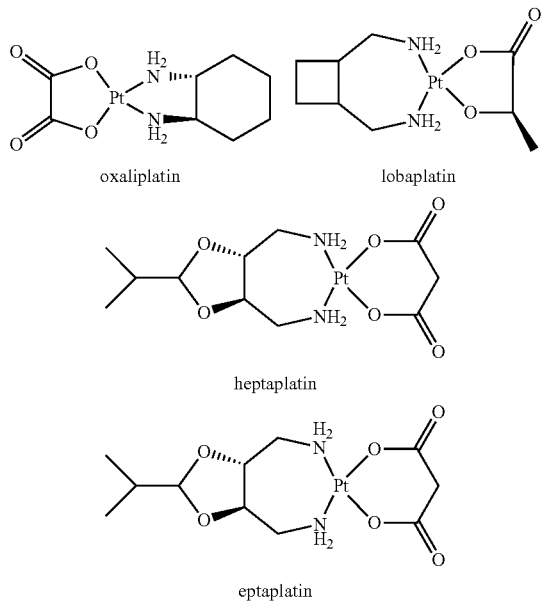

oxaliplatin  lobaplatin heptaplatin eptaplatin

In some embodiments, the non-leaving ligand component of a PCAN agent is a tridentate ligand, as illustrated, for example, by [Pt(dien)Cl]$^+$ and [Pt(Et$_2$dien)Cl]$^+$:

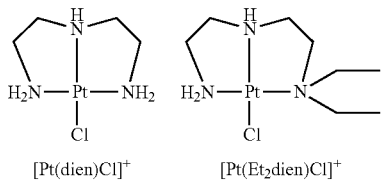

[Pt(dien)Cl]$^+$  [Pt(Et$_2$dien)Cl]$^+$

Modified Ligands

In some embodiments, a non-leaving ligand or an axial ligand is modified to comprise a bioactive moiety, for example to alter the pharmacokinetic properties of a PCAN agent, to provide a targeting function, or to provide an additional therapeutic effect. Bioactive moieties include, but are not limited to, targeting ligands such as steroid units, carbohydrates, bile acids, peptides (e.g., netropsin, distamycin), and folate units; histone deacetylase inhibitors, p53 agonists, alkylating agents, nonsteroidal anti-inflammatory complexes, and adamantylamine. See, e.g., Johnstone et al., 2016; Li et al., 2018; Kozubik et al., 2008.

Isomers

As mentioned above, platinum complexes exhibit various forms of stereoisomerism. In some embodiments, a PCAN agent is a cis isomer. In some embodiments, a PCAN agent is a trans isomer. In some embodiments, a PCAN agent is a λ stereoisomer. In some embodiments, a PCAN agent is a δ stereoisomer.

Pharmaceutically Acceptable Salts

The disclosed PCAN agents can form salts. "Pharmaceutically acceptable salts" are those salts which retain at least some of the biological activity of the free (non-salt) compound and which can be administered as drugs or pharmaceuticals to an individual. Such salts, for example, include: (1) acid addition salts, formed with inorganic acids such as hydrochloric acid, hydrobromic acid, sulfuric acid, nitric acid, phosphoric acid, and the like; or formed with organic acids such as acetic acid, oxalic acid, propionic acid, succinic acid, maleic acid, tartaric acid and the like; (2) salts formed when an acidic proton present in the parent compound either is replaced by a metal ion, e.g., an alkali metal ion, an alkaline earth metal ion, or an aluminum ion; or coordinates with an organic base. Acceptable organic bases include ethanolamine, diethanolamine, triethanolamine and the like. Acceptable inorganic bases include aluminum hydroxide, calcium hydroxide, potassium hydroxide, sodium carbonate, sodium hydroxide, and the like. Further examples of pharmaceutically acceptable salts include those listed in Berge et al., Pharmaceutical Salts, J. Pharm. Sci. 1977 January; 66(1):1-19.

Methods of Synthesis

The disclosed PCAN agents can be synthesized using methods well known in the art. Examples of such methods are provided in the working examples, below.

Pharmaceutical Compositions

Pharmaceutical compositions comprise one or more of the PCAN agents described above, or a pharmaceutically acceptable salt of the PCAN agent, together with a pharmaceutically acceptable vehicle, such as water, or a buffered aqueous solution. Pharmaceutical compositions can be provided as lyophilized powders containing, e.g., sodium chloride and mannitol, to be reconstituted using water for injection.

In some embodiments, a pharmaceutical composition comprises both cis and trans isomers. In some embodiments, a pharmaceutical composition comprises substantially only cis isomers or substantially only trans isomers. A pharmaceutical composition comprises "substantially only" cis isomers or substantially only trans isomers when the relevant isomer is below a detectable level as measured by a conventional analytical method such as spectroscopy or chromatography.

In some embodiments, a pharmaceutical composition comprises both λ and δ stereoisomers. In some embodiments, a pharmaceutical composition comprises substantially only λ stereoisomers or substantially only δ stereoisomers. A pharmaceutical composition comprises "substantially only" λ stereoisomers or substantially only δ stereoisomers when the relevant stereoisomer is below a detectable level as measured by a conventional analytical method such as spectroscopy or chromatography.

Delivery Vehicles

In some embodiments, a pharmaceutical composition includes a delivery vehicle for the PCAN agent. Delivery vehicles include, but are not limited to, a carbon nanotube, a carbon nanoparticle, a PEGylated nanosized graphene oxide, a gold nanoparticle, a nanosized metal-organic framework, a nanoparticle comprising polysiloxane, a polymeric micellar nanoparticle, a block copolymer micelle nanoparticle, and a liposome. See, e.g., Johnstone et al., 2016.

Therapeutic Methods

The disclosed PCAN agents are useful for treating neoplastic disorders, including cancer. "Treat" as used in this disclosure means reducing or inhibiting the progression of one or more symptoms of the disorder or disease for which a PCAN agent is administered, such as inflammation or pain.

For example, treatment of cancer may include inhibiting the progression of a cancer, for example, by reducing proliferation of neoplastic or pre-neoplastic cells; destroying neoplastic or pre-neoplastic cells; or inhibiting metastasis or decreasing the size of a tumor. Cancers that can be treated include, but are not limited to, multiple myeloma (including systemic light chain amyloidosis and Waldenström's macroglobulinemia/lymphoplasmocytic lymphoma), myelodysplastic syndromes, myeloproliferative neoplasms, gastrointestinal malignancies (e.g., esophageal, esophagogastric junction, gallbladder, gastric, colon, pancreatic, hepatobiliary, anal, and rectal cancers), leukemias (e.g., acute myeloid, acute myelogenous, chronic myeloid, chronic myelogenous, acute lymphocytic, acute lymphoblastic, chronic lymphocytic, and hairy cell leukemia), Hodgkin lymphoma, non-Hodgkin's lymphomas (e.g., B-cell lymphoma, hairy cell leukemia, primary cutaneous B-cell lymphoma, and T-cell lymphoma), lung cancer (e.g., small cell and non-small cell lung cancers), basal cell carcinoma, plasmacytoma, breast cancer, bladder cancer, kidney cancer, neuroendocrine tumors, adrenal tumors, bone cancer, soft tissue sarcoma, head and neck cancer, thymoma, thymic carcinoma, cervical cancer, uterine cancers, ovarian cancer (e.g., Fallopian tube and primary peritoneal cancers), vaginal cancer, vulvar cancer, penile cancer, testicular cancer, prostate cancer, melanoma (e.g., cutaneous and uveal melanomas), non-melanoma skin cancers (e.g., basal cell skin cancer, dermatofibrosarcoma protuberans, Merkel cell carcinoma, and squamous cell skin cancer), malignant pleural mesothelioma, central nervous system (CNS) cancers (e.g., astrocytoma, oligodendroglioma, anaplastic glioma, glioblastoma, intra-cranial ependymoma, spinal ependymoma, medulloblastoma, CNS lymphoma, spinal cord tumor, meningioma, brain metastases, leptomeningeal metastases, metastatic spine tumors), and occult primary cancers (i.e., cancers of unknown origin).

In some embodiments, a PCAN agent can be administered in conjunction with one or more other cancer therapies such as chemotherapies, immunotherapies, tumor-treating fields (TTF; e.g., OPTUNE® system), radiation therapies (XRT), and other therapies (e.g., hormones, autologous bone marrow transplants, stem cell reinfusions). "In conjunction with" includes administration together with, before, or after administration of the one or more other cancer therapies.

Chemotherapies include, but are not limited to, FOLFOX (leucovorin calcium, fluorouracil, oxaliplatin), FOLFIRI (leucovorin calcium, fluorouracil, irinotecan), FOLFIRINOX (leucovorin calcium, fluorouracil, irinotecan, oxaliplatin), irinotecan (e.g., CAMPTOSAR®), capecitabine (e.g., XELODA®), gemcitabine (e.g., GEMZAR®), paclitaxel (e.g., ABRAXANE®), dexamethasone, lenalidomide (e.g., REVLIMID®), pomalidomide (e.g., POMALYST®), cyclophosphamide, regorafenib (e.g., STIVARGA®), erlotinib (e.g., TARCEVA®), ixazomib (e.g., NINLARO®), bevacizumab (e.g., AVASTIN®), bortezomib (e.g., VELCADE®, NEOMIB®), cetuximab (e.g., ERBITUX®), daratumumab (e.g., DARZALEX®), elotumumab (e.g., EMPLICITI™), carfilzomib (e.g., KYPROLIS®), palbociclib (e.g., IBRANCE®), fulvestrant (e.g., FASLODEX®), carboplatin, cisplatin, taxol, nab paclitaxel (e.g., ABRAXANE®), 5-fluorouracil, RVD (lenalidomide, bortezomib, dexamethasone), pomolidamide (e.g., POMALYST®), temozolomide (e.g., TEMODAR®), PCV (procarbazine, lomustine, vincristine), methotrexate (e.g., TREXALL®, RASUVO®, XATMEP®), carmustine (e.g., BICNU®, GLIADEL WAFER®), etoposide (e.g., ETOPOPHOS®, TOPOSAR®), sunitinib (e.g., SUTENT®), everolimus (e.g., ZORTRESS®, AFINITOR®), rituximab (e.g., RITUXAN®, MABTHERA®), R-MPV (vincristine, procarbazine, rituximab), cytarabine (e.g., DEPOCYT®, CYTOSAR-U®), thiotepa (e.g., TEPADINA®), busulfan (e.g., BUSULFEX®, MYLERAN®), TBC (thiotepa, busulfan, cyclophosphamide), ibrutinib (e.g., IMBRUVICA®), topotecan (e.g., HYCAMTIN®), pemetrexed (e.g., ALIMTA®), vemurafenib (e.g., ZELBORAF®), cobimetinib (e.g., COTELLIC®), dabrafenib (e.g., TAFINLAR®), trametinib (e.g., MEKINIST®), alectinib (e.g., ALECENSA®), lapatinib (e.g., TYKERB®), neratinib (e.g., NERLYNX®), ceritinib (e.g., ZYKADIA®), brigatinib (e.g., ALUNBRIG®), afatinib (e.g., GILOTRIF®, GIOTRIF®), gefitinib (e.g., IRESSA®), osimertinib (e.g., TAGRISSO®, TAGRIX®), and crizotinib (e.g., XALKORI®).

Immunotherapies include, but are not limited to, checkpoint inhibitors, including monoclonal antibodies such as ipilimumab (e.g., YERVOY®), nivolumab (e.g., OPDIVO®), pembrolizumab (e.g., KEYTRUDA®); cytokines; cancer vaccines; and adoptive cell transfer.

In some embodiments, one or more PCAN agents described above are administered to a patient with a cancer, including any of those cancers listed above. In some embodiments, as described below, the patient has colon cancer, rectal cancer, pancreatic cancer, multiple myeloma, or glioblastoma multiforme and the platinum complexes(s) are administered in conjunction with an additional therapy appropriate for the particular cancer.

The disclosed platinum complexes can be used to treat these and other disorders in the same way a platinum complex anti-neoplastic agent is used, and these methods are well known. An advantage of platinum complexes, however, is that the cannabinoid can be delivered at or near the site of action of the therapeutic agent, where the released cannabinoid can provide further therapeutic benefits.

Suitable administration routes include, but are not limited to, intravenous, intraperitoneal, intratumoral, intra-arterial, intra-arterial with blood brain barrier disruption, oral, topical, transdermal, inhalation, parenteral, sublingual, buccal, rectal, vaginal, intranasal, subcutaneous, and intrapleural. The dose of a PCAN agent can be based on the doses typically used for other platinum complex anti-neoplastic agents. These doses are well known in the art.

Example 1. Synthesis of Compound 1

Compound 1 can be synthesized as follows.

Ortho-dihydroxybenzenes are connected to platinum in the presence of $AgNO_3$ (Faming Zhuanli Shenqing, 101177435, 14 May 2008, Faming Zhuanli Shenqing, 101177434, 14 May 2008). Connection of one or two (as shown) phenolic groups, in this case from a cannabinoid (CBD in this example) are connected in a similar fashion.

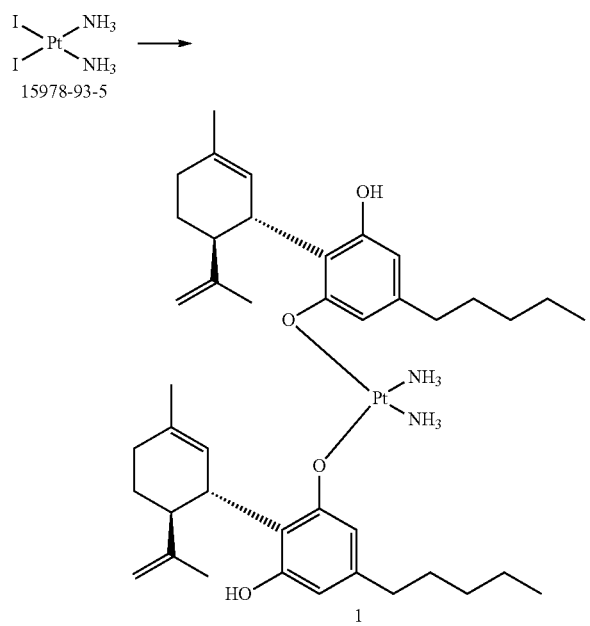

Example 2. Synthesis of Compounds 2a, 2b, and 2c

Compound 2a can be synthesized as follows.

Compound 2b can be synthesized as follows.

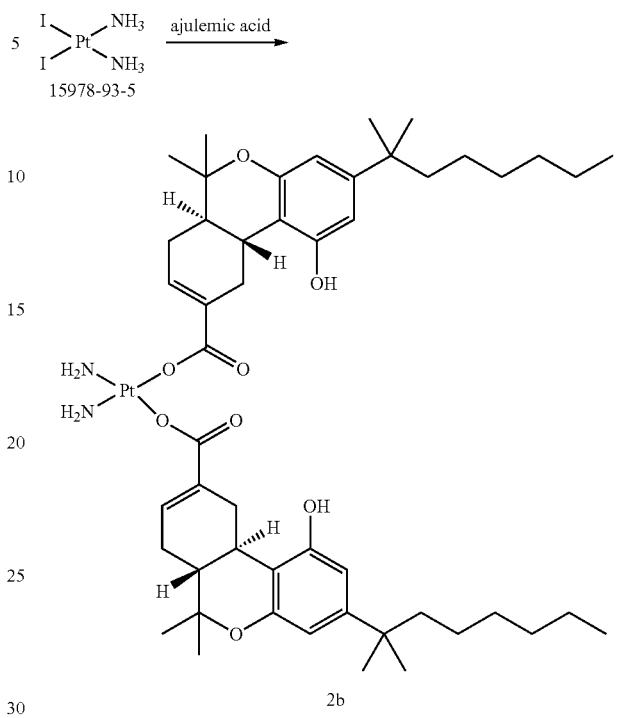

Compound 2c can be synthesized as follows.

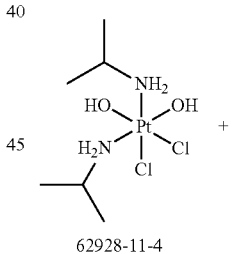

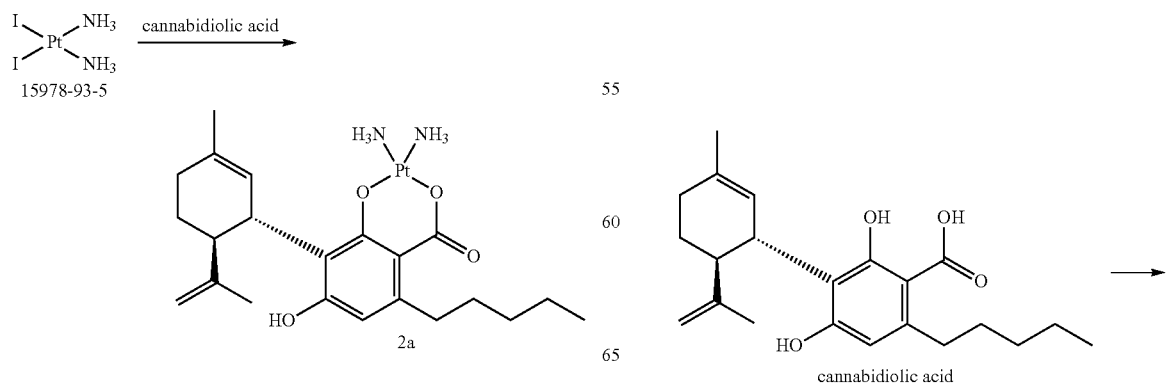

cannabidiolic acid

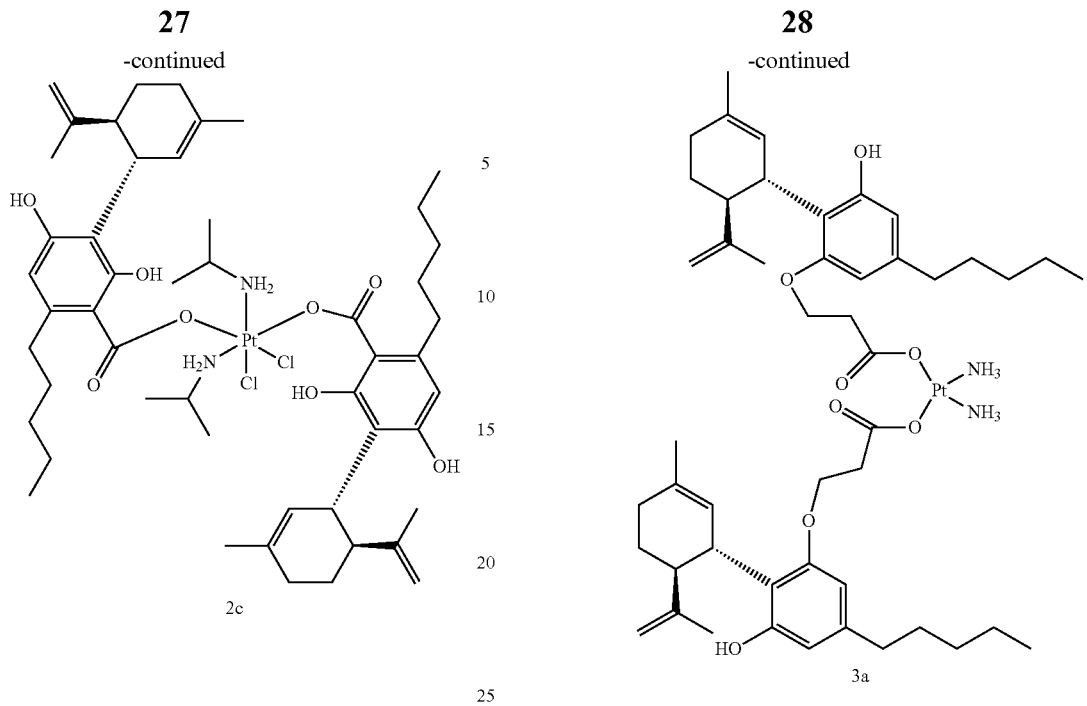
Example 3. Synthesis of Compounds 3a and 3b
Compound 3a can be synthesized as follows.
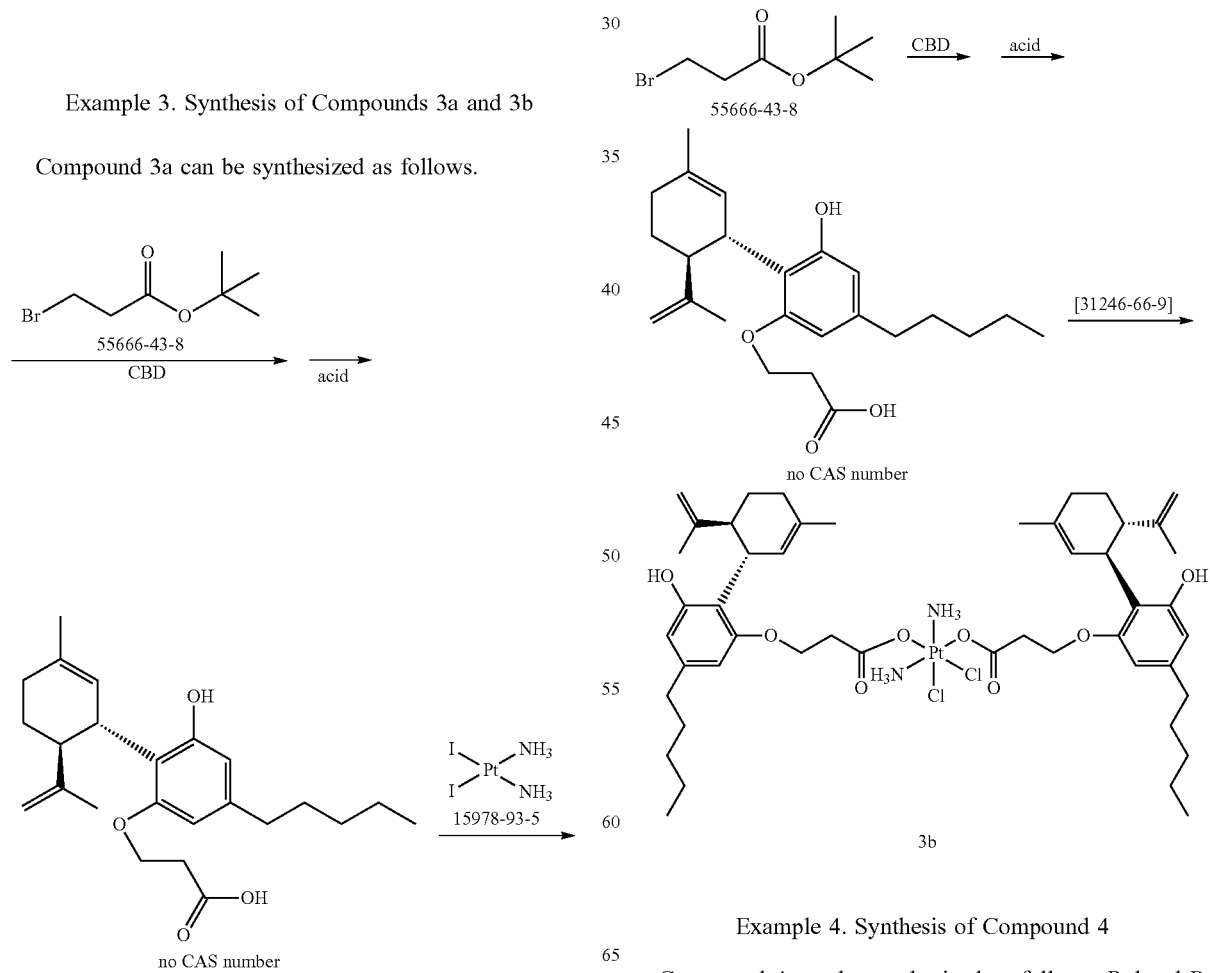
Compound 3b can be synthesized as follows.
Example 4. Synthesis of Compound 4
Compound 4 can be synthesized as follows. Related Pt dicarbonates (129551-82-2, 129551-94-6, 160953-30-0, Inorganic Chemistry (1995), 34(5), 1015-2, EP 328274 A1 19890816) have been made from [62928-11-4] and pyrocarbonates. Acylation of OH groups on $Pt^{4+}$ is well known. Accordingly, reaction of CBD and [62928-11-4] with phosgene or an appropriate surrogate reagent system forms the carbonate link between the cannabinoid and platinum. Alternatively, $Pt^{4+}$ OH groups can react with alkyl carbonates to form new alkyl carbonates; thus, it may also be possible to generate the reagent where both X groups are CBD and react it with the Pt reagent.

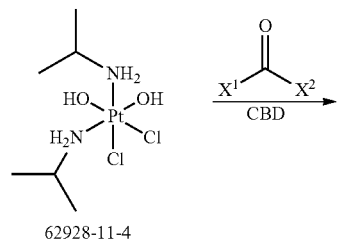

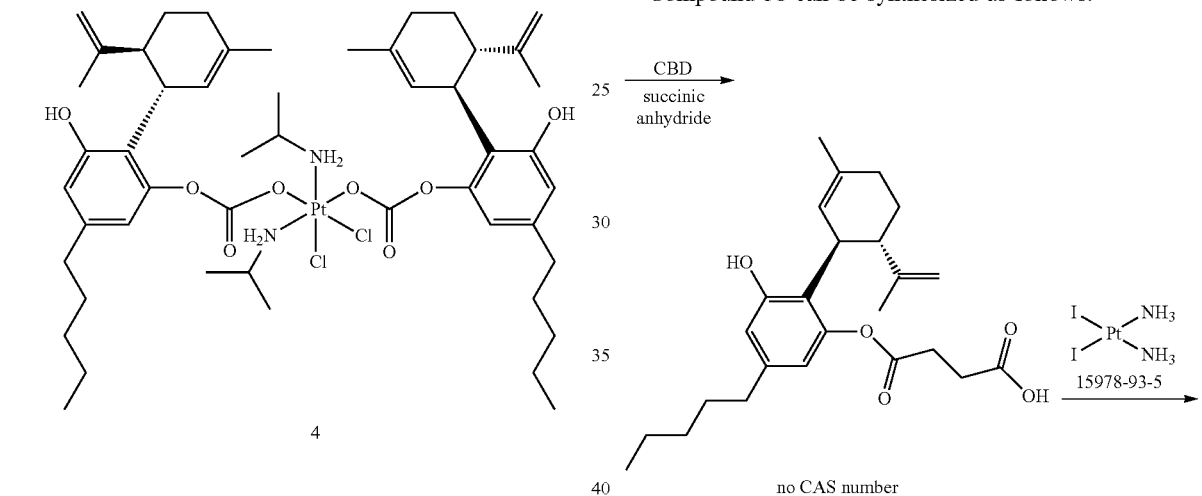

4

Example 5. Synthesis of Compounds 5a and 5b

Compound 5a can be synthesized as follows.

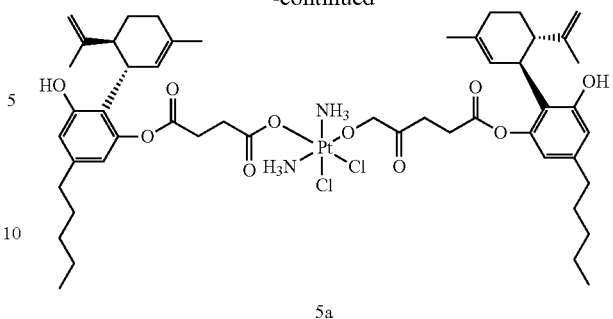

5a

Alternatively, cannabidiol can be acylated with succinic anhydride to form the cannabidiol propionic acid derivative shown in the synthesis of Compound 5b, below. Reaction of this intermediate with [62928-11-4] under esterification conditions yields compound 5a.

Compound 5b can be synthesized as follows.

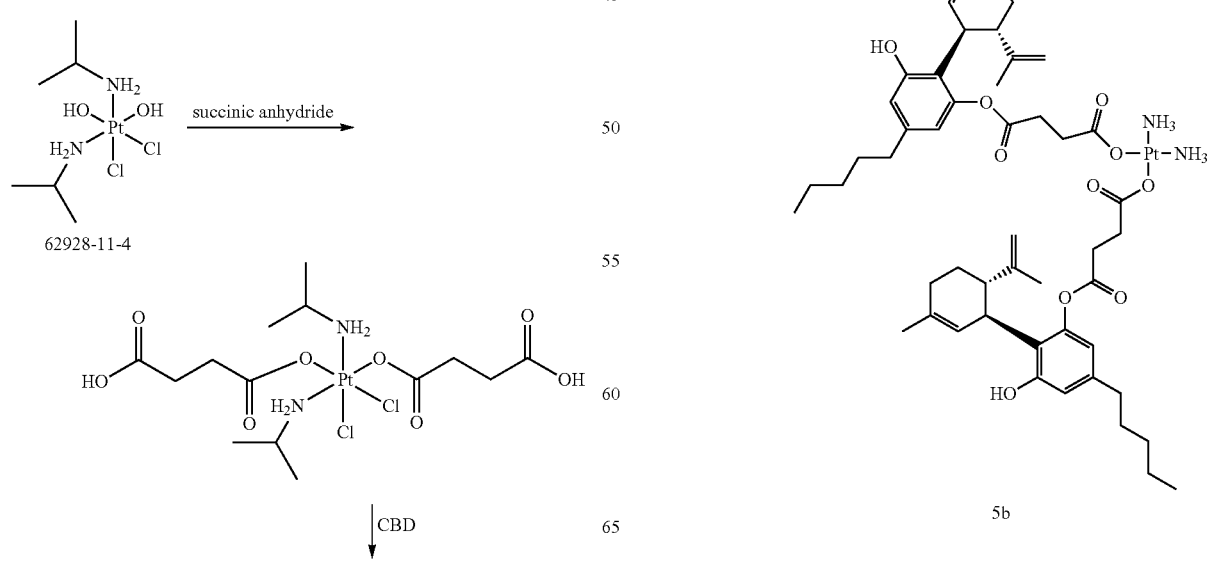

5b

Example 6. Synthesis of Compound 6

Compound 6 can be synthesized as follows.

Phenols can be converted to the corresponding vinyl ether as shown in the reference in the Scheme below. Reaction of the vinyl ether with isocyanic acid [75-13-8] (JOC, 28(8), 2082-5; 1963) generates the isocyanate. The isocyanate then reacts with [62928-11-4] (Inorganic Chemistry (1995), 34(5), 1015-2; EP 328274 A1 19890816) to form Example 6.

Example 7. Synthesis of Compound 7

Compound 7 can be synthesized as follows.

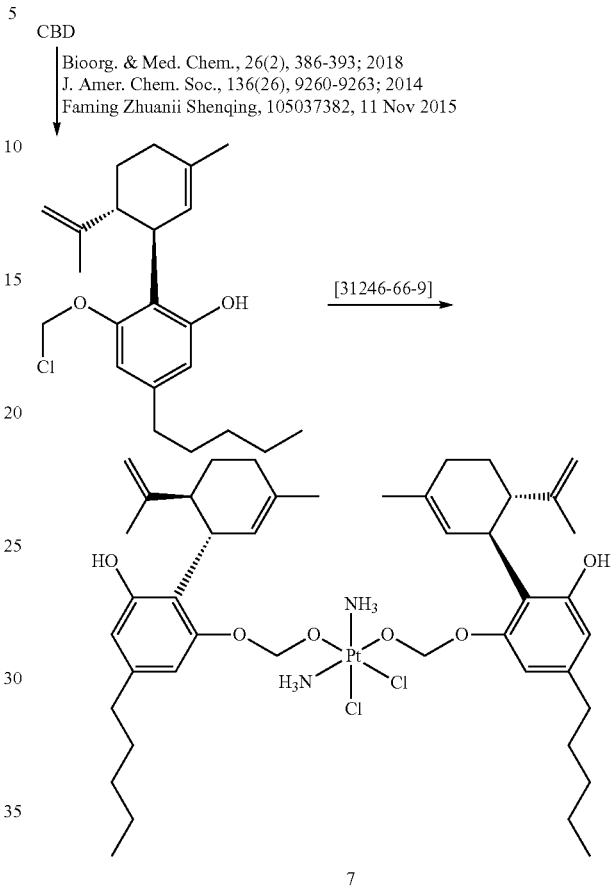

REFERENCES

Intini et al., "Novel Antitumor Platinum(II) Conjugates Containing the Nonsteroidal Anti-inflammatory Agent Diclofenac: Synthesis and Dual Mechanisms of Antiproliferative Effects," Inorg. Chem. 56, 1483-97, 2017

Jia et al., "Elucidation of the Mechanism of Action for Metal Based Anticancer Drugs by Mass Spectrometry-Based Quantitative Proteomics," Molecules 24, 581, 2019, 17 pages Johnstone et al., "The Next Generation of Platinum Drugs: Targeted Pt(II) Agents, Nanoparticle Delivery, and Pt(IV) Prodrugs," Chem. Rev. 116, 3436-86, 2016

Kozubik et al., "Novel Anticancer Platinum(IV) Complexes with Adamantylamine: Their Efficiency and Innovative Chemotherapy Strategies Modifying Lipid Metabolism," Metal-Based Drugs, Volume 2008, Article ID 417897, 15 pages Li et al., "Current Developments in Pt(IV) Prodrugs Conjugated with Bioactive Ligands," Bioinorganic Chemistry and Applications Volume 2018, Article ID 8276139, 18 pages Monroe et al., "Anti-cancer characteristics and ototoxicity of platinum(II) amine complexes with only one leaving ligand," PLoS ONE 13, 30192505, 2018, 21 pages Ndagi et al., "Metal complexes in cancer therapy—an update from drug design perspective," Drug Design, Development and Therapy 11, 599-616, 2017

Neumann et al., "Conjugates of Cisplatin and Cyclooxygenase Inhibitors as Potent Antitumor Agents Overcoming Cisplatin Resistance," (No Suggestions) 9, 1150-53, 2014 2014

Tolan et al., "Anti-tumor platinum (IV) complexes bearing the anti-inflammatory drug naproxen in the axial position," Appl. Organometal Chem. 33:e4763, 2019, 12 pages Zhou et al., "The effect of geometric isomerism on the anticancer activity of the monofunctional platinum complex trans-[Pt(NH3)2(phenanthridine)ClNO3," Chem. Commun. 54, 2788-91, 2018.

The invention claimed is:

1. A platinum complex anti-neoplastic agent, comprising:
   (a) a central platinum atom;
   (b) a non-leaving ligand component selected from the group consisting of:
      (i) a first non-leaving ligand and a second non-leaving ligand;
      (ii) a first non-leaving ligand, a second non-leaving ligand, and a third non-leaving ligand;
      (iii) a bidentate non-leaving ligand; and
      (iv) a tridentate non-leaving ligand;
   (c) a leaving ligand component selected from the group consisting of:
      (i) a first leaving ligand, wherein the first leaving ligand is a first cannabinoid leaving ligand attached to the central platinum atom via a first oxygen atom of (1) a first hydroxy group of the first cannabinoid leaving ligand or (2) a first carboxyl group of the first cannabinoid leaving ligand;
      (ii) a first leaving ligand and a second leaving ligand, wherein the first leaving ligand is the first cannabinoid leaving ligand; and
      (iii) a bidentate leaving ligand, wherein the bidentate leaving ligand is the first cannabinoid leaving ligand attached to the central platinum atom via a first and a second oxygen atom independently selected from (1) an oxygen atom of a first hydroxy group of the first cannabinoid leaving ligand, (2) an oxygen atom of a second hydroxy group of the first cannabinoid leaving ligand, (3) an oxygen atom of a first carboxyl group of the first cannabinoid leaving ligand, and (4) an oxygen atom of a second carboxyl group of the first cannabinoid leaving ligand.

2. The platinum complex anti-neoplastic agent of claim 1, wherein
   (I) the leaving ligand component comprises the second leaving ligand, wherein the second leaving ligand is a second cannabinoid leaving ligand attached to the central platinum atom via (1) a second hydroxy group of the second cannabinoid leaving ligand or (2) a second carboxyl group of the second cannabinoid leaving ligand; or
   (II) the leaving ligand component comprises the second leaving ligand, wherein the second leaving ligand is a leaving ligand of a platinum complex anti-neoplastic agent selected from the group consisting of cisplatin, carboplatin, oxaliplatin, nedaplatin, eptaplatin, lobaplatin, nedaplatin, and satraplatin.

3. The platinum complex anti-neoplastic agent of claim 1, further comprising:
   (d) a first axial ligand and a second axial ligand.

4. The platinum complex anti-neoplastic agent of claim 3, wherein the first axial ligand is a first cannabinoid axial ligand attached to the central platinum atom via a first oxygen atom of (1) a first hydroxy group of the first cannabinoid axial ligand or (2) a first carboxyl group of the first cannabinoid axial ligand.

5. The platinum complex anti-neoplastic agent of claim 4, wherein the second axial ligand is a second cannabinoid axial ligand attached to the central platinum atom via a first oxygen atom of (1) a first hydroxy group of the second cannabinoid axial ligand or (2) a first carboxyl group of the second cannabinoid axial ligand.

6. The platinum complex anti-neoplastic agent of claim 1, wherein the first cannabinoid leaving ligand is attached to the central platinum atom via a linker selected from the group consisting of:

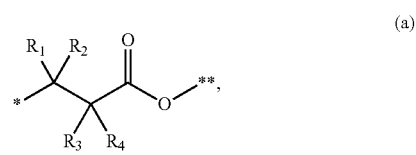

wherein * is the point of attachment of the first cannabinoid leaving ligand and ** is the point of attachment to the central platinum atom and wherein (1) $R_1$, $R_2$, $R_3$, and $R_4$ independently are selected from the group consisting of:
   (a) H;
   (b) C1-C8 linear or branched alkyl, optionally substituted with
      (1) 1, 2, 3, 4, 5, 6, 7, 8, or 9 fluorine atoms; and/or
      (2) 1, 2, or 3 substituents independently selected from the Group One Substituents;
   (c) C1-C8 linear or branched heteroalkyl containing 1, 2, or 3 heteroatoms independently selected from O, N, and S and optionally substituted with
      (1) 1, 2, 3, 4, 5, 6, 7, 8, or 9 fluorine atoms; and/or
      (2) 1, 2, or 3 substituents independently selected from the Group One Substituents;
   (d) phenyl, optionally substituted with 1, 2, or 3 substituents independently selected from the group consisting of:
      (1) C1-C6 linear or branched alkyl, optionally substituted with
         (i) 1, 2, 3, 4, 5, or 6 fluorine atoms; and/or
         (ii) 1 or 2 substituents independently selected from the Group Two Substituents; and
      (2) C1-C6 linear or branched heteroalkyl containing 1 or 2 heteroatoms independently selected from O, N, and S and optionally substituted with
         (i) 1, 2, 3, 4, 5, or 6 fluorine atoms; and/or
         (ii) 1 or 2 substituents independently selected from the Group One Substituents;
   (e) a 6-to 10-membered aromatic, optionally substituted with 1, 2, 3, or 4 substituents independently selected from the group consisting of:
      (1) phenyl;
      (2) halide;
      (3) cyano;
      (4) C1-C6 linear or branched alkyl, optionally substituted with
         (i) 1, 2, 3, 4, 5, 6, 7, 8, or 9 fluorine atoms; and/or
         (ii) 1, 2, or 3 substituents independently selected from the Group Two Substituents, and
      (5) C1-C6 linear or branched heteroalkyl containing 1, 2, or 3 atoms independently selected from O, N, and S and optionally substituted with (i) 1, 2, 3, 4, 5, 6, 7, 8, or 9 fluorine atoms; and/or
(ii) 1, 2, or 3 substituents independently selected from the Group Two Substituents;
(f) 5-to 10-membered heteroaromatic comprising 1, 2, 3, 4, 5, or 6 heteroatoms independently selected from O, N, and S and optionally substituted with 1, 2, 3, or 4 substituents independently selected from
(1) phenyl;
(2) halide;
(3) cyano;
(4) trifluoromethyl;
(5) C1-C6 linear or branched alkyl optionally substituted with
(i) 1, 2, 3, 4, 5, 6, 7, 8, or 9 fluorine atoms; and/or
(ii) 1, 2, or 3 substituents independently selected from the Group Two Substituents; and
(6) C1-C6 linear or branched heteroalkyl containing 1, 2, or 3 atoms independently selected from O, N, and S and optionally substituted with
(i) 1, 2, 3, 4, 5, 6, 7, 8, or 9 fluorine atoms; and/or
(ii) 1, 2, or 3 substituents independently selected from the Group Two Substituents;

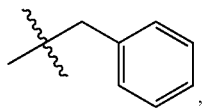

(g)

optionally substituted with 1, 2, or 3 substituents independently selected from the group consisting of:
(1) C1-C6 linear or branched alkyl, optionally substituted with
(i) 1, 2, 3, 4, 5, or 6 fluorine atoms; and/or
(ii) 1, 2, or 3 substituents independently selected from the Group Two Substituents;
(h) 3-to 9-membered cycloheteroalkyl having 1, 2, or 3 heteroatoms independently selected from O, N, and S and optionally substituted with 1, 2, or 3 substituents independently selected from the group consisting of:
(1) C1-C6 linear or branched alkyl, optionally substituted with
(i) 1, 2, 3, 4, 5, 6, 7, 8, or 9 fluorine atoms; and/or
(ii) 1, 2, or 3 substituents independently selected from the Group Two Substituents,
(2) C1-C6 linear or branched heteroalkyl, optionally substituted with
(i) 1, 2, 3, 4, 5, 6, 7, 8, or 9 fluorine atoms and/or
(ii) 1, 2, or 3 substituents independently selected from the Group Two Substituents,
(3) phenyl, optionally substituted with 1, 2, or 3 substituents independently selected from the Group Two Substituents, and
(4) 5-to 10-membered heteroaromatic, optionally substituted with 1, 2, or 3 substituents independently selected from the Group Two Substituents; and
(i) C3-C6 cycloalkyl, optionally substituted with 1, 2, or 3 substituents independently selected from:
(1) C1-C6 linear or branched alkyl, optionally substituted with
(i) 1, 2, 3, 4, 5, 6, 7, 8, or 9 fluorine atoms; and/or
(ii) 1, 2, or 3 substituents independently selected from the Group Two Substituents,
(2) C1-C6 linear or branched heteroalkyl, optionally substituted with
(i) 1, 2, 3, 4, 5, 6, 7, 8, or 9 fluorine atoms; and/or
(ii) 1, 2, or 3 substituents independently selected from the Group Two Substituents,
(3) phenyl, optionally substituted with 1, 2, or 3 substituents independently selected from Group Two Substituents; and
(4) 5-to 10-membered heteroaromatic, optionally substituted with 1, 2, or 3 substituents independently selected from the Group Two Substituents, wherein Group One Substituents is a group of substituents consisting of:
(a) —OH;
(b) —NH$_2$;
(c) =O;
(d) =S;
(e) =NR$_7$, where R$_7$ is H or is C1-C3 linear or branched alkyl or C1-C3 linear or branched heteroalkyl comprising an O, N, or S atom;
(f) —C(O)OR$_4$, wherein R$_4$ is H or C1-C3 linear or branched alkyl;
(g) —C(O)NR$_5$R$_6$, wherein R$_5$ and R$_6$ independently are H or C1-C6 linear or branched alkyl;
(h) halide;
(i) C1-C6 linear or branched alkoxyl;
(j) C1-C6 linear or branched alkylamino;
(k) C1-C6 linear or branched dialkylamino;
(l) 6- to 10-membered aromatic, optionally substituted with 1, 2, 3, or 4 substituents independently selected from
(i) phenyl;
(ii) halide;
(iii) cyano;
(iv) C1-C6 linear or branched alkyl, optionally substituted with
(1) 1, 2, 3, 4, 5, 6, 7, 8, or 9 fluorine atoms; and/or
(2) 1, 2, or 3 substituents independently selected from the Group Two Substituents; and
(v) C1-C6 linear or branched heteroalkyl containing 1, 2, or 3 atoms independently selected from O, N, and S and optionally substituted with
(1) 1, 2, 3, 4, 5, 6, 7, 8, or 9 fluorine atoms; and/or
(2) 1, 2, or 3 substituents independently selected from the Group Two Substituents;
(m) 5-to 10-membered heteroaromatic, optionally substituted with 1, 2, 3, or 4 substituents independently selected from
(i) phenyl;
(ii) halide;
(iii) cyano;
(iv) C1-C6 linear or branched alkyl, optionally substituted with
(1) 1, 2, 3, 4, 5, 6, 7, 8, or 9 fluorine atoms; and/or
(2) 1, 2, or 3 substituents independently selected from the Group Two Substituents; and
(v) C1-C6 linear or branched heteroalkyl containing 1, 2, or 3 atoms independently selected from O, N, and S and optionally substituted with
(1) 1, 2, 3, 4, 5, 6, 7, 8, or 9 fluorine atoms; and/or
(2) 1, 2, or 3 substituents independently selected from the Group Two Substituents;
(n) 3-to 9-membered cycloheteroalkyl having 1, 2, or 3 heteroatoms independently selected from O, N, and S, optionally substituted with 1, 2, 3, or 4 substituents independently selected from
(i) phenyl;
(ii) halide;
(iii) cyano;

(iv) C1-C6 linear or branched alkyl, optionally substituted with
  (1) 1, 2, 3, 4, 5, 6, 7, 8, or 9 fluorine atoms; and/or
  (2) 1, 2, or 3 substituents independently selected from the Group Two Substituents; and
(v) C1-C6 linear or branched heteroalkyl containing 1, 2, or 3 atoms independently selected from O, N, and S and optionally substituted with
  (1) 1, 2, 3, 4, 5, 6, 7, 8, or 9 fluorine atoms; and/or
  (2) 1, 2, or 3 substituents independently selected from the Group Two Substituents; and
(o) C3-C6 cycloalkyl, optionally substituted with 1, 2, 3, or 4 substituents independently selected from
  (i) phenyl;
  (ii) halide;
  (iii) cyano;
  (iv) C1-C6 linear or branched alkyl, optionally substituted with
    (1) 1, 2, 3, 4, 5, 6, 7, 8, or 9 fluorine atoms; and/or
    (2) 1, 2, or 3 substituents independently selected from the Group Two Substituents; and
  (v) C1-C6 linear or branched heteroalkyl containing 1, 2, or 3 atoms independently selected from O, N, and S and optionally substituted with
    (1) 1, 2, 3, 4, 5, 6, 7, 8, or 9 fluorine atoms; and/or
    (2) 1, 2, or 3 substituents independently selected from the Group Two Substituents;

Group Two Substituents is a group of substituents consisting of:
(a) —OH;
(b) —NH$_2$;
(c) =O;
(d) =S;
(e) =NR$_7$, where R$_7$ is H or is C1-C3 linear or branched alkyl or C1-C3 linear or branched heteroalkyl comprising an O, N, or S atom;
(f) —C(O)OR$_4$, wherein R$_4$ is H or C1-C3 linear or branched alkyl;
(g) —C(O)NR$_5$R$_6$, wherein R$_5$ and R$_6$ independently are H or C1-C6 linear or branched alkyl;
(h) halide;
(i) cyano;
(j) trifluoromethyl;
(k) C1-C6 linear or branched alkoxyl;
(l) C1-C6 linear or branched alkylamino;
(m) C1-C6 linear or branched dialkylamino;
(n) 6-to 10-membered aromatic; and
(o) 5-to 10-membered heteroaromatic comprising 1, 2, 3, 4, 5, or 6 heteroatoms independently selected from O, N, and S;
OR
(2) any of R$_1$, R$_2$, R$_3$, and R$_4$ are connected to form one or more rings; and

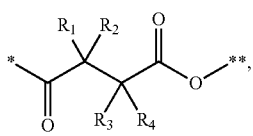
(b)

wherein *, **, R$_1$, R$_2$, R$_3$, and R$_4$ are as defined above.

7. The platinum complex-anti-neoplastic agent of claim 1, wherein the second cannabinoid leaving ligand is attached to the central platinum atom via a linker selected from the group consisting of:

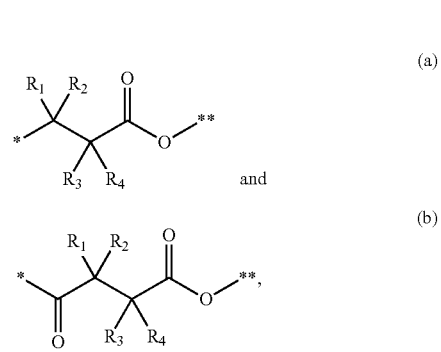

wherein *, **, R$_1$, R$_2$, R$_3$, and R$_4$ are as defined above.

8. The platinum complex anti-neoplastic agent of claim 4, wherein the first cannabinoid axial ligand is attached to the central platinum atom via a linker selected from the group consisting of:

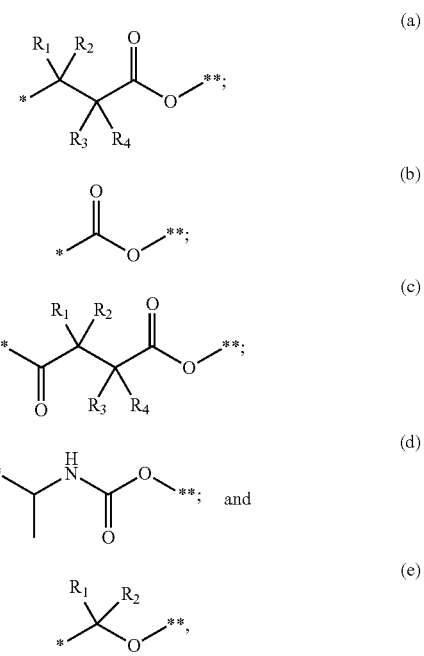

wherein *, **, R$_1$, R$_2$, R$_3$, and R$_4$ are defined above.

9. The platinum complex anti-neoplastic agent of claim 5, wherein the second cannabinoid axial ligand is attached to the central platinum atom via a linker selected from the group consisting of:

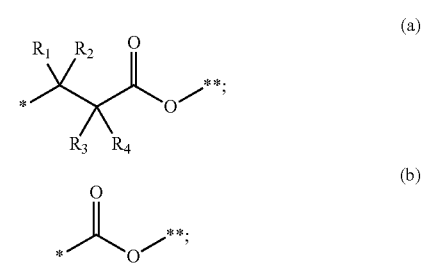

(c)

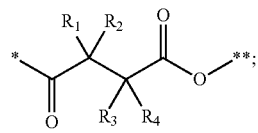

(d)

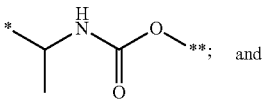
and (e)

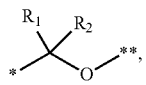

wherein *, **, $R_1$, $R_2$, $R_3$, and $R_4$ are as defined above.

10. A platinum complex anti-neoplastic agent, comprising:
   (a) a central platinum atom;
   (b) a non-leaving ligand component selected from the group consisting of
      (i) a first non-leaving ligand and a second non-leaving ligand;
      (ii) a first non-leaving ligand, a second non-leaving ligand, and a third non-leaving ligand;
      (iii) a bidentate non-leaving ligand; and
      (iv) a tridentate non-leaving ligand;
   (c) a leaving ligand component selected from the group consisting of
      (i) a first leaving ligand;
      (ii) a first leaving ligand and a second leaving ligand; and
      (iii) a bidentate leaving ligand; and
   (d) a first axial ligand and a second axial ligand, wherein the first axial ligand is a first cannabinoid axial ligand attached to the central platinum atom via an oxygen atom of (1) a first hydroxy group of the first cannabinoid axial ligand or (2) a first carboxyl group of the first cannabinoid axial ligand.

11. The platinum complex anti-neoplastic agent of claim 10, wherein:
   (I) the second axial ligand is a second cannabinoid axial ligand attached to the central platinum atom via (1) a first hydroxy group of the second cannabinoid axial ligand or (2) a first carboxyl group of the second cannabinoid axial ligand;
   (II) the second axial ligand is a second cannabinoid axial ligand attached to the central platinum atom via (1) a first hydroxy group of the second cannabinoid axial ligand or (2) a first carboxyl group of the second cannabinoid axial ligand, wherein the first cannabinoid axial ligand is attached to the central platinum atom via a linker selected from the group consisting of:

(a)

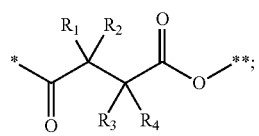

(b)

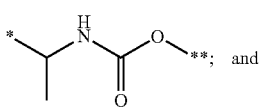

(c)

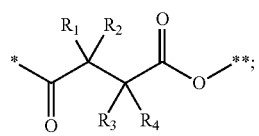

(d)

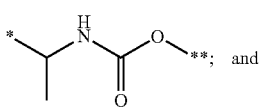
and (e)

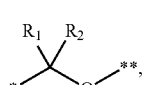

wherein *, **, $R_1$, $R_2$, $R_3$, and $R_4$ are as defined above; or
   (III) wherein the first cannabinoid axial ligand is attached to the central platinum atom via a linker selected from the group consisting of:

(a)

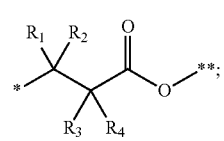

(b)

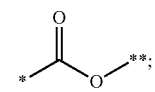

(c)

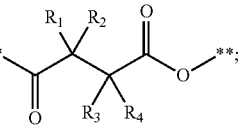

(d)

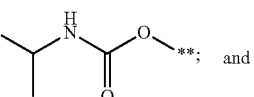
and (e)

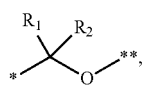

wherein *, **, $R_1$, $R_2$, $R_3$, and $R_4$ are as defined above.

12. The platinum complex anti-neoplastic agent of claim 11, wherein the second cannabinoid axial ligand is attached to the central platinum atom via a linker selected from the group consisting of:

(a)

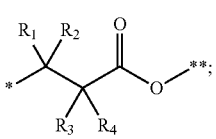

(b)

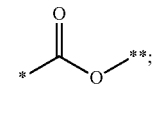

-continued

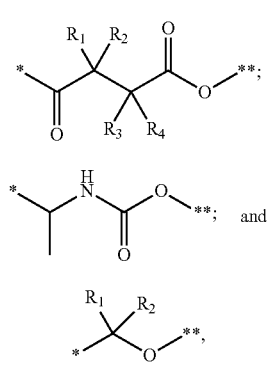

wherein * *, $R_1$, $R_2$, $R_3$, and $R_4$ are as defined above.

13. The platinum complex anti-neoplastic agent of claim 1, which is

I

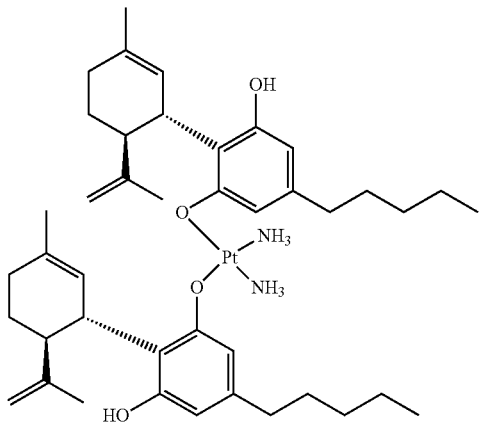

14. The platinum complex anti-neoplastic agent of claim 10, wherein the first cannabinoid leaving ligand is provided by a cannabinoid selected from the group consisting of a cannabigerol, a cannabichromene, a cannabidiol, a tetrahydrocannabinol, a cannabicyclol, a cannabielsoin, a cannabinol, a cannabinodiol, a cannabitriol, a dehydrocannabifuran, a cannabifuran, a cannabichromanon, and a cannabiripsol, or an active metabolite thereof.

15. The platinum complex anti-neoplastic agent of claim 1, wherein the non-leaving ligand component is the non-leaving ligand component of a platinum complex anti-neoplastic agent selected from the group consisting of cisplatin, carboplatin, oxaliplatin, nedaplatin, eptaplatin, and satraplatin.

16. The platinum complex anti-neoplastic agent of claim 1, wherein the non-leaving ligand component comprises a bioactive moiety.

17. The platinum complex anti-neoplastic agent of claim 3, wherein an axial ligand comprises a bioactive moiety.

18. A pharmaceutically acceptable salt of the platinum complex anti-neoplastic agent of claim 1.

19. A pharmaceutical composition comprising:
(a) platinum complex anti-neoplastic agents of claim 1 or pharmaceutically acceptable salts therof; and
(b) a pharmaceutically acceptable vehicle.

20. The pharmaceutical composition of claim 19, which comprises:
(a) cis and trans isomers of the platinum complex anti-neoplastic agents or pharmaceutically acceptable salts thereof;
(b) substantially only the cis isomers;
(c) substantially only trans isomers;
(d) λ and δ stereoisomers of the platinum complex anti-neoplastic agents or pharmaceutically acceptable salts thereof;
(e) substantially only λ stereoisomers; or
(f) substantially only δ stereoisomers.

21. The pharmaceutical composition of claim 19, which comprises a delivery vehicle.

22. The pharmaceutical composition of claim 21, wherein the delivery vehicle is selected from the group consisting of a carbon nanotube, a carbon nanoparticle, a PEGylated nanosized graphene oxide, a gold nanoparticle, a nanosized metal-organic framework, a nanoparticle comprising polysiloxane, a polymeric micellar nanoparticle, a block copolymer micelle nanoparticle, and a liposome.

23. The platinum complex anti-neoplastic agent of claim 1, wherein the first cannabinoid leaving ligand is provided by a cannabinoid selected from the group consisting of a cannabigerol, a cannabichromene, a cannabidiol, a tetrahydrocannabinol, a cannabicyclol, a cannabielsoin, a cannabinol, a cannabinodiol, a cannabitriol, a dehydrocannabifuran, a cannabifuran, a cannabichromanon, and a cannabiripsol, or an active metabolite thereof.

* * * * *